(12) United States Patent
Shiba et al.

(10) Patent No.: US 11,794,106 B2
(45) Date of Patent: Oct. 24, 2023

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Takamasa Shiba, Tokyo (JP); Hiroshi Kobayashi, Tokyo (JP); Jun Waga, Tokyo (JP); Yutaka Yoshida, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/449,575

(22) Filed: Sep. 30, 2021

(65) Prior Publication Data

US 2022/0105431 A1 Apr. 7, 2022

(30) Foreign Application Priority Data

Oct. 2, 2020 (JP) .................. 2020-167947

(51) Int. Cl.
*A63F 13/00* (2014.01)
*A63F 13/56* (2014.01)
(Continued)

(52) U.S. Cl.
CPC .............. *A63F 13/56* (2014.09); *A63F 13/35* (2014.09); *A63F 13/52* (2014.09)

(58) Field of Classification Search
CPC ....... A63F 13/825; A63F 13/822; A63F 13/00
See application file for complete search history.

(56) References Cited

U.S. PATENT DOCUMENTS 8,612,228 B2 * 12/2013 Hiraishi ............... G06T 13/205
  704/260
2009/0305758 A1 * 12/2009 Nomura ............... A63F 13/822
  463/43

FOREIGN PATENT DOCUMENTS

JP  2002095865 A  4/2002
JP  2013236841 A  11/2013
JP  2019170966 A  10/2019

OTHER PUBLICATIONS

Clash of Clans https://youtu.be/jYWJt9LPXfc (Year: 2020).*
Notice of Reasons for Refusal dated Nov. 9, 2021 for Japanese Patent Application No. 2020-167947; pp. all.

* cited by examiner

*Primary Examiner* — David L Lewis
*Assistant Examiner* — Eric M Thomas
(74) *Attorney, Agent, or Firm* — Dorsey & Whitney LLP

(57) ABSTRACT

A non-transitory computer-readable medium including a video game processing program for causing a server to perform functions to control progress of a video game is provided. The functions include: a first arranging function configured to arrange a first object determined based on a user operation at a position determined based on a position of the user terminal in a virtual space corresponding to map information of a real space; a second arranging function configured to arrange a second object with which a predetermined event is associated at a position determined based on a position of the first object after a time determined in accordance with the first object elapses from a time when the first object is arranged; and a generating function configured to generate the predetermined event in accordance with a (Continued)

OBJECT RELATED INFORMATION

| In-game element | First object | Arrangement time | Second object |
|---|---|---|---|
| Food A | Food object A | 3 minutes later | Monster object A |
| | | | Monster object B |
| | | | ⋮ |
| Food B | Food object B | 10 minutes later | Monster object C |
| | | | Monster object D |
| | | | ⋮ |
| Food C | Food object C | 20 minutes later | Monster object E |
| | | | Monster object F |
| | | | ⋮ |
| Food D | Food object D | 30 minutes later | Monster object G |
| | | | Monster object H |
| | | | ⋮ |
| ⋮ | ⋮ | ⋮ | ⋮ | positional condition regarding the positions of the user terminal and the second object.

11 Claims, 17 Drawing Sheets

(51) Int. Cl.
    *A63F 13/35*     (2014.01)
    *A63F 13/52*     (2014.01)

Fig. 17

OBJECT RELATED INFORMATION

| In-game element | First object | Arrangement time | Second object |
|---|---|---|---|
| Food A | Food object A | 3 minutes later | Monster object A |
| | | | Monster object B |
| | | | ⋮ |
| Food B | Food object B | 10 minutes later | Monster object C |
| | | | Monster object D |
| | | | ⋮ |
| Food C | Food object C | 20 minutes later | Monster object E |
| | | | Monster object F |
| | | | ⋮ |
| Food D | Food object D | 30 minutes later | Monster object G |
| | | | Monster object H |
| | | | ⋮ |
| ⋮ | ⋮ | ⋮ | ⋮ |

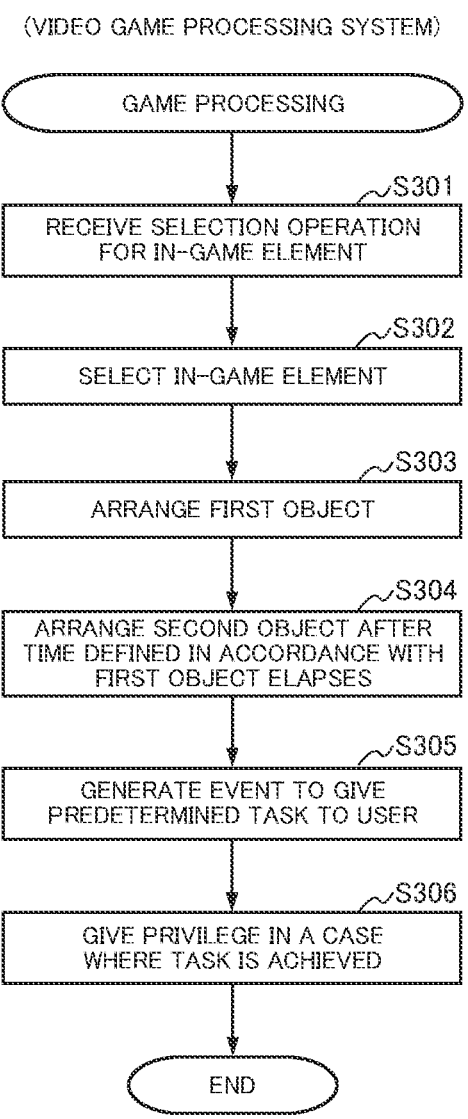

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2020-167947 filed on Oct. 2, 2020, the disclosure of which is expressly incorporated herein by reference in its entirety for any purpose.

BACKGROUND

At least one of embodiments of the present disclosure relates to a non-transitory computer-readable medium including a video game processing program and a video game processing system for causing a server to perform functions to control progress of a video game using positional information of a user terminal in response to an operation of a user.

In recent years, various systems each using positional information of a user terminal have been proposed in a field of video games.

In such a system, there is one in which a score of a user is calculated on the basis of a score map in which a score area is set in accordance with a position in a real space and positional information for specifying a position of a mobile object, for example, a user terminal. Examples of such system may be found in Japanese Patent Application Publication No. 2002-95865.

SUMMARY

In the meantime, in a system using positional information of a user terminal, there is a system in which objects are arranged in advance in a virtual space corresponding to map information of a real space on the system side regardless of game play by a user. Each of the objects herein corresponds to a predetermined event, and the event corresponding to the object is generated in accordance with a relationship between a position of the object and a position of a user terminal corresponding to positional information of the user terminal in a virtual space.

Here, in a case where a video game is caused to proceed in accordance with generation of an event corresponding to an object that is arranged in advance regardless of game play by the user, there were cases where the user is caused to generate the event with respect to the object. Thus, in order to improve interest of the user in the video game, it is required to have variation in arrangement of objects.

It is an object of at least one of embodiments of the present disclosure to solve the problem described above, and to improve interest of a user in a video game.

According to one non-limiting aspect of the present disclosure, there is provided a non-transitory computer-readable medium including a video game processing program for causing a server to perform functions to control progress of a video game using positional information of a user terminal of a user in response to a user operation.

The functions include a first arranging function configured to arrange an object determined on a basis of a user operation as a first object at a position determined on a basis of a position of the user terminal in a virtual space corresponding to map information of a real space.

The functions also include a second arranging function configured to arrange an object with which a predetermined event is associated at a position determined on a basis of a position of the first object as a second object in the virtual space after a time determined in accordance with the first object elapses from a time when the first object is arranged.

The functions also include a generating function configured to generate the predetermined event in accordance with a positional condition regarding the position of the user terminal and a position of the second object.

According to another non-limiting aspect of the present disclosure, there is provided a video game processing system for controlling progress of a video game using positional information of a user terminal of a user in response to a user operation. The video game processing system includes a communication network, a server, and the user terminal.

The video game processing system includes a first arranger configured to arrange an object determined on a basis of a user operation as a first object at a position determined on a basis of a position of the user terminal in a virtual space corresponding to map information of a real space.

The video game processing system also includes a second arranger configured to arrange an object with which a predetermined event is associated at a position determined on a basis of a position of the first object as a second object in the virtual space after a time determined in accordance with the first object elapses from a time when the first object is arranged.

The video game processing system also includes a generator configured to generate the predetermined event in accordance with a positional condition regarding the position of the user terminal and a position of the second object.

According to still another non-limiting aspect of the present disclosure, there is provided a non-transitory computer-readable medium including a video game processing program for causing a user terminal to perform functions to control progress of a video game using positional information of a user terminal of a user in response to the user operation.

The functions include a first arranging function configured to arrange an object determined on a basis of a user operation as a first object at a position determined on a basis of a position of the user terminal in a virtual space corresponding to map information of a real space.

The functions also include a second arranging function configured to arrange an object with which a predetermined event is associated at a position determined on a basis of a position of the first object as a second object in the virtual space after a time determined in accordance with the first object elapses from a time when the first object is arranged.

The functions also include a generating function configured to generate the predetermined event in accordance with a positional condition regarding the position of the user terminal and a position of the second object.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings:

FIG. 17 is an explanatory drawing for explaining an example of a storage state of information corresponding to at least one of the embodiments of the present disclosure;

FIG. 18 is a flowchart illustrating an example of game processing corresponding to at least one of the embodiments of the present disclosure;

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
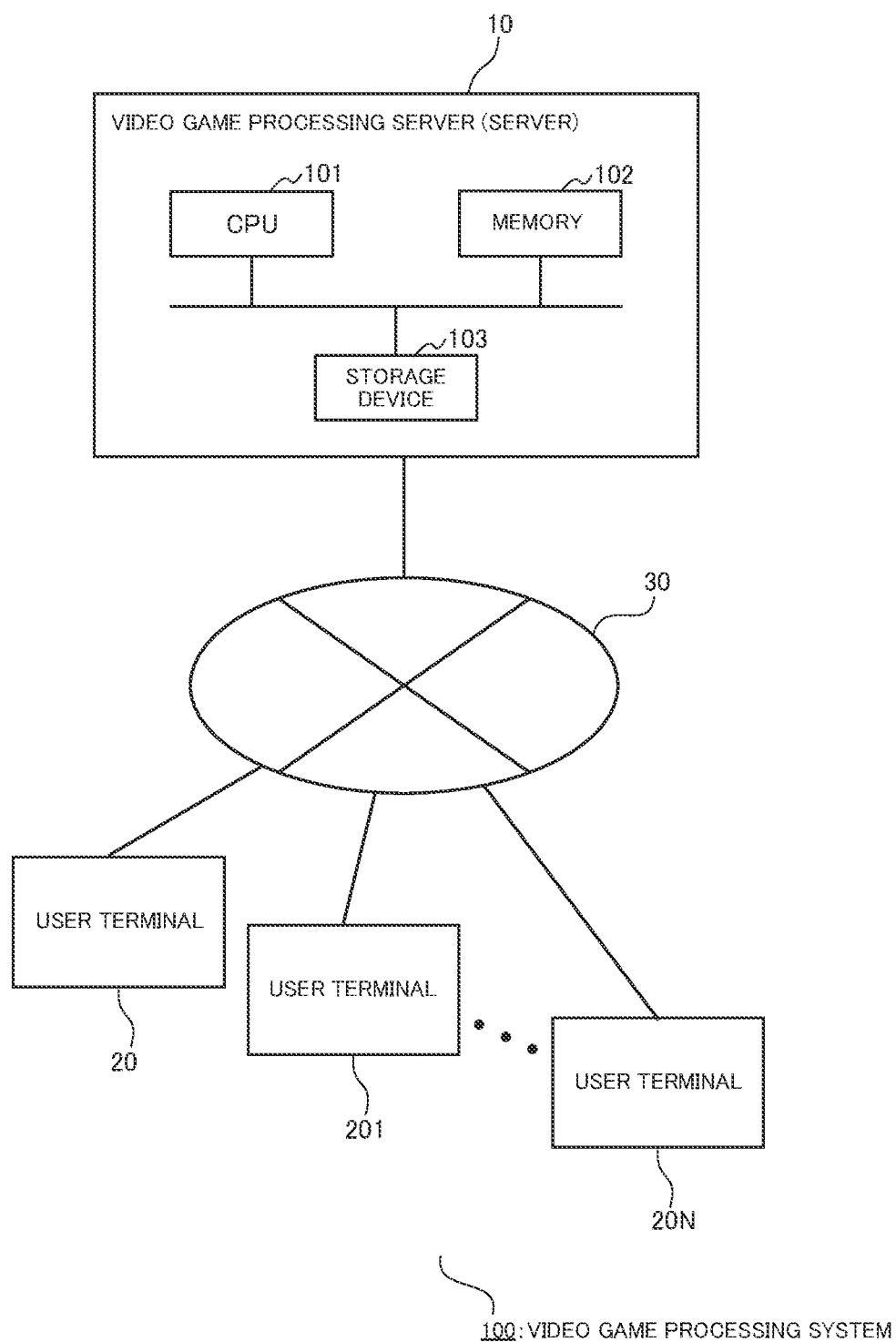
FIG. 1 is a block diagram illustrating an example of a configuration of a video game processing system corresponding to at least one of the embodiments of the present disclosure.

FIG. 1 is a block diagram illustrating an example of a configuration of a video game processing system 100 according to one embodiment of the present disclosure. As illustrated in FIG. 1, the video game processing system 100 includes a video game processing server 10 (hereinafter; referred to as a "server 10") and user terminals (or player terminals) 20, and 201 to 20N ("N" is an arbitrary integer) respectively used by users (or players) of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly. However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
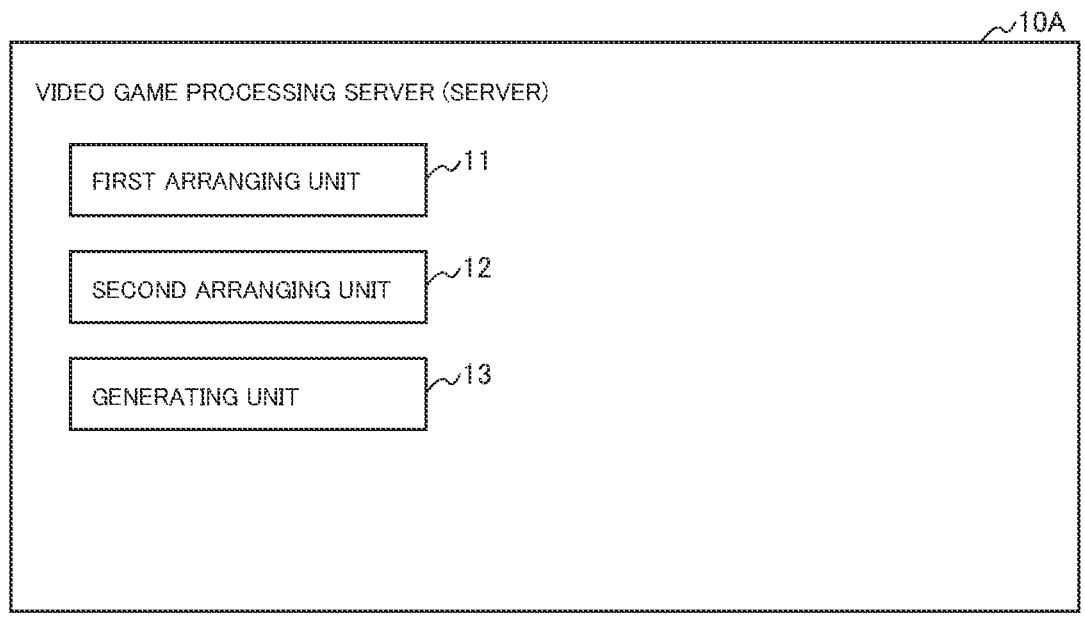
FIG. 2 is a block diagram illustrating a configuration of a server corresponding to at least one of the embodiments of the present disclosure.

FIG. 2 is a block diagram illustrating a configuration of a video game processing server 10A (hereinafter, referred to as a "server 10A"), which is an example of the configuration of the server 10. As illustrated in FIG. 2, the server 10A at least includes a first arranging unit 11, a second arranging unit 12, and a generating unit 13.

The first arranging unit 11 has a function to arrange an object determined on the basis of a user operation (hereinafter, referred to as a "first object") at a position determined on the basis of a position of a user terminal (in the present embodiment, the user terminal 20) in a virtual space corresponding to map information of a real space.

Here, the virtual space corresponding to the map information of the real space means a virtual space that is generated by using the map information of the real space. A configuration to generate the virtual space is not limited particularly. However, it is preferable that the first arranging unit 11 is configured so that the user can recognize that the virtual space is generated on the basis of the map information of the real space. As an example of such a configuration, there is a configuration in which the virtual space is generated by respectively arranging objects corresponding to roads and buildings in the real space at positions corresponding to roads and buildings in the real space. In this regard, a configuration of the object corresponding to each of the roads and the buildings in the real space is not limited particularly. However, it is preferable that the object is configured so that the user can recognize that it has a correspondence relationship with a road, a building, or the like. As examples of such a configuration, there are an object created to resemble the appearance of a road and an object (for example, a character) different from objects that constitute the virtual space (for example, the ground). Further, a configuration to associate the position in the real space with the position in the virtual space is not limited particularly. However, the generating unit 12 may be configured so that a coordinate in the real space and a coordinate in the virtual space are defined in a one-to-one relationship, or may be configured so that the coordinates are defined in a plural-to-one relationship or a one-to-plural relationship.

Further, the user operation means an input operation to the user terminal 20 by the user. The user operation is not limited particularly. However, it is preferable that the user operation is an input operation for selection by the user. As an example of the user operation, there is an input operation in which information displayed on a game screen is selected.

Further, the first object determined on the basis of the user operation means an object to be used in the video game, for example, an object that is defined by selecting one from a plurality of objects by means of a user operation. Further, the object means a virtual object or subject that appears in the video game.

Further, a configuration to define a first object on the basis of a user operation is not limited particularly. However, it is preferable that the first arranging unit 11 is configured so that the user can recognize which first object is selected. As an example of the configuration to define a first object on the basis of a user operation, there is a configuration in which the user terminal 20 is caused to display information regarding a plurality of first objects and the user is caused to input selection of any one of the first objects on the basis of the displayed information.

Further, the position of the user terminal 20 means a position indicated by positional information of the user terminal 20. A configuration of the positional information is not limited particularly. However, it is preferable that the positional information is configured so as to contain coordinates that can specify the position of the user terminal 20 in the real space. As examples of the configuration to obtain the positional information of the user terminal 20, there are a configuration to obtain the positional information by using a GPS signal, and a configuration to obtain the positional information on the basis of reception intensity information of wireless signals from a plurality of beacon transmitters.

Further, the position determined on the basis of the position of the user terminal 20 means a position that is determined based on a position in the virtual space corresponding to the position of the user terminal 20 in the real space. The position determined on the basis of the position of the user terminal 20 is not limited particularly. However, it is preferable that such a position is a position within a range that the user can predict from the position of the user terminal 20.

Further, the phrase "arrange the first object" means that the first object is associated with a position in the virtual space. A configuration to arrange the first object is not limited particularly. However, it is preferable that the first arranging unit 11 is configured so that, in a case where a position at which the first object is arranged or an area corresponding to the first object, which includes the position, is included in a display area of the user terminal 20, the first object is arranged so that the first object can be displayed on the display screen of the user terminal 20.

The second arranging unit 12 has a function to arrange an object with which a predetermined event is associated (hereinafter, referred to as a "second object") at a position determined on the basis of a position of the first object in the virtual space after a time determined in accordance with the first object elapses from a time when time when the first object is arranged.

Here, the time determined in accordance with the first object means a time that is set to the first object in advance. In a case where a plurality of first objects exists, predetermined times are respectively set to the plurality of first objects in advance. In this regard, the same time may be set to a part or all of the first objects, or different times may respectively be set to all of the first objects.

Further, the second object with which the predetermined event is associated means an object that is to be used in the video game and is associated with an event in the video game.

Further, the event means any of various kinds of occurrences that can be generated in the video game. A configuration of the event is not limited particularly. However, it is preferable that the event is configured so as to be generated in a case where a generation condition is satisfied in a virtual space corresponding to map information on a real space in accordance with progress of the video game. As examples of the predetermined event, there are an event of fighting with a predetermined enemy character and an event of recovering a character of the user. In this regard, as examples of the event corresponding to the second object, there are various kinds of events each of which is associated with a type of the second object.

Further, the position determined on the basis of the position of the first object means a position that is determined based on the position of the first object in the virtual space. The position determined on the basis of the position of the first object is not limited particularly. However, it is preferable that such a position is a position within a range that the user can predict from the position of the first object.

Further, the phrase "arrange the second object" means that a second object and a position in the virtual space are associated with each other. A configuration to arrange the second object is not limited particularly. However, it is preferable that the second arranging unit 12 is configured so that, in a case where a position at which the second object is arranged or an area corresponding to the second object, which includes the position, is included in the display area of the user terminal 20, the second object is arranged so that the second object can be displayed on the display screen of the user terminal 20. In this regard, when the second object is to be arrange, the first object may not be displayed, or arrangement of the first object may be terminated. Namely, by arranging the second object, such a control that the first object is changed into the second object may be executed. Further, the first object and the second object may be the same object as each other; or each of the first object and the second object may be an object with a different shape or a different property.

The generating unit 13 has a function to generate an event in accordance with a positional condition regarding the position of the user terminal 20 and the position of the second object.

Here, the positional condition regarding the position of the user terminal 20 and the position of the second object means a condition including that the position of the user terminal 20 and the position of the second object have a predetermined relationship. As an example of the positional condition, there is a condition that a distance between the position of the user terminal 20 and the position of the arranged second object is a predetermined length or shorter. In this regard, the generating unit 13 may be configured to generate the event in a case where a condition other than the positional condition is also satisfied. As an example of the condition other than the positional condition, there is a condition that a selection operation against the second object is carried out by the user.

Further, the event generated in accordance with the positional condition is not limited particularly. However, it is preferable that such an event is an event corresponding to the second object. As an example of the event corresponding to the second object, there is an event that is set to a character indicating the second object.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter; referred to as the "system 100") according to the present embodiment will be described.

Figure 3:
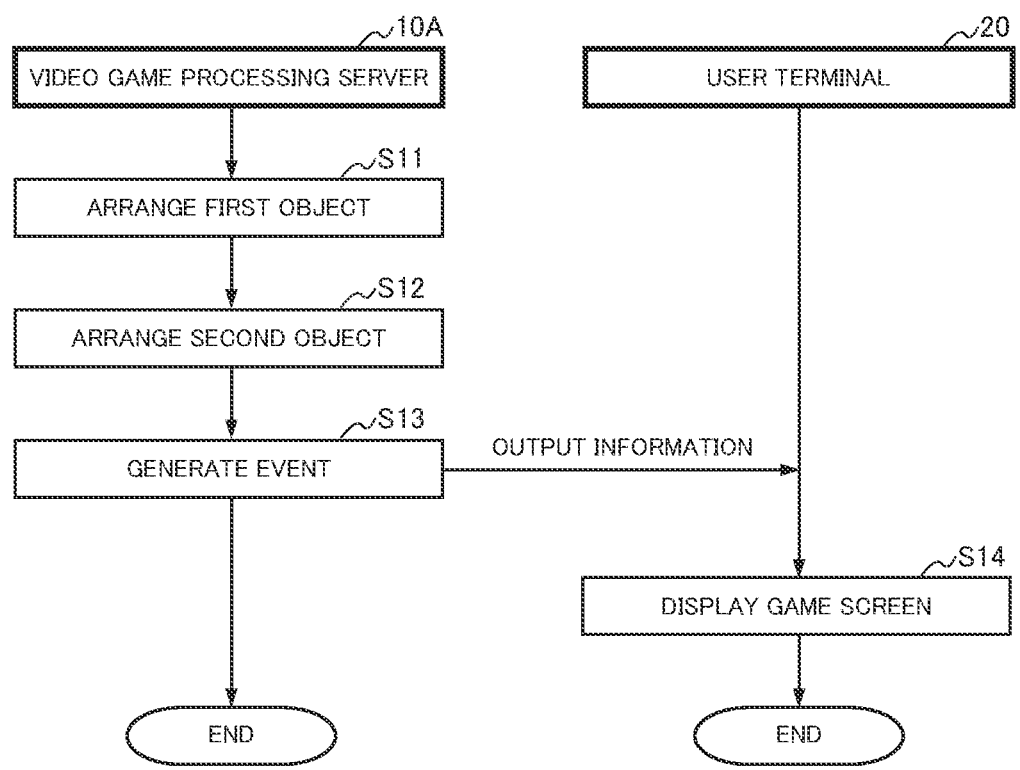
FIG. 3 is a flowchart illustrating an example of game processing corresponding to at least one of the embodiments of the present disclosure.

FIG. 3 is a flowchart illustrating an example of game processing executed by the system 100. In the game processing according to the present embodiment, processes related to a control of progress of the video game using the positional information of the user terminal 20 are executed. Hereinafter, a case where the server 10A and the user terminal 20 (hereinafter, referred to as the "terminal 20") execute the game processing will be described as an example.

The game processing is started as an opportunity that the terminal 20 accessing the server 10A requests display of a virtual space, for example.

In the game processing, the server 10A first arranges a first object determined on the basis of a user operation at a position determined on the basis of a position of the terminal 20 in a virtual space corresponding to map information of a real space (Step S11). In the present embodiment, the server 10A stores information regarding the arranged first object and information regarding the arranged position in a predetermined storage region.

When the first object is arranged, the server 10A arranges a second object with which a predetermined event is associated at a position determined on the basis of a position of the first object in the virtual space after a time determined in accordance with the first object elapses from a time when the first object is arranged (Step S12). In the present embodiment, the server 10A stores information regarding the arranged second object and information regarding the arranged position in a predetermined storage region.

When the second object is arranged, the server 10A generates the predetermined event in accordance with a positional condition regarding the position of the terminal 20 and the position of the second object (Step S13). In the present embodiment, the server 10A transmits, to the terminal 20, output information for causing the terminal 20 to display the content related to generation of the event.

When the terminal 20 receives the information from the server 10A, the terminal 20 outputs a game screen onto a predetermined display screen of a display device (Step S14). In the present embodiment, when the terminal 20 outputs the game screen, the server 10A and the terminal 20 terminate the processes herein.

Figure 4:
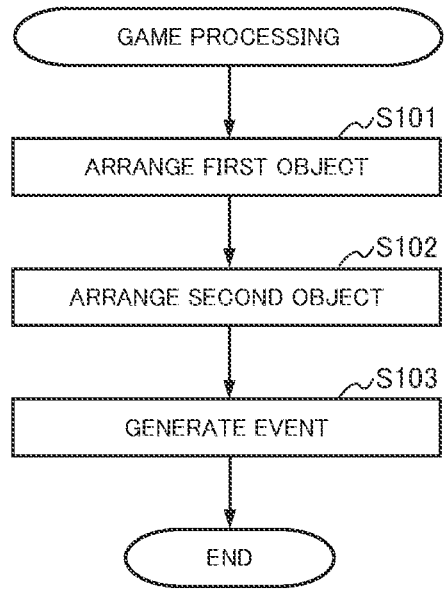
FIG. 4 is a flowchart illustrating an example of an operation of a server side in the game processing corresponding to at least one of the embodiments of the present disclosure.

FIG. 4 is a flowchart illustrating an example of an operation of the server 10A in the game processing. Here, an operation of the server 10A in the system 100 will be described again.

In the game processing, the server 10A first arranges a first object determined on the basis of a user operation at a position determined on the basis of a position of the terminal 20 in a virtual space corresponding to map information of a real space (Step S101). Next, the server 10A arranges a second object with which a predetermined event is associated at a position determined on the basis of a position of the first object in the virtual space after a time determined in accordance with the first object elapses from a time when the first object is arranged (Step S102). Then, the server 10A generates the predetermined event in accordance with a positional condition regarding the position of the terminal 20 and the position of the second object (Step S103). When the event is generated, the server 10A terminates the processes herein.

Figure 5:
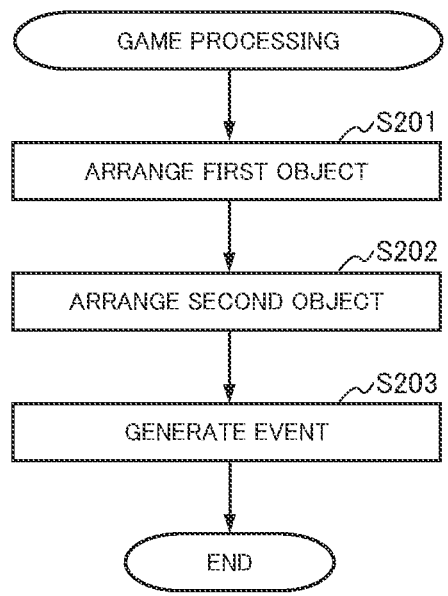
FIG. 5 is a flowchart illustrating an example of an operation of a terminal side in the game processing corresponding to at least one of the embodiments of the present disclosure.

FIG. 5 is a flowchart illustrating an example of the terminal 20 in a case where the terminal 20 executes the game processing. Hereinafter, a case where the terminal 20 executes the game processing by a single body will be described as an example. In this regard, the configuration of the terminal 20 includes the similar functions to those of the server 10A except that the terminal 20 receives various kinds of information from the server 10A. For this reason, its explanation is omitted from a point of view to avoid repeated explanation.

In the game processing, the terminal 20 first arranges a first object determined on the basis of a user operation at a position determined on the basis of a position of the terminal 20 in a virtual space corresponding to map information of a real space (Step S201). Next, the terminal 20 arranges a second object with which a predetermined event is associated at a position determined on the basis of a position of the first object in the virtual space after a time determined in accordance with the first object elapses from a time when the first object is arranged (Step S202). Then, the terminal 20 generates the predetermined event in accordance with a positional condition regarding the position of the terminal 20 and the position of the second object (Step S203). When the event is generated, the terminal 20 terminates the processes herein.

As explained above, as one aspect of the first embodiment, the server 10A that controls progress of the video game using positional information of the user terminal in response to the user operation is configured so as to at least include the first arranging unit 11, the second arranging unit 12, and the generating unit 13. Thus, the first arranging unit 11 arranges the first object determined on the basis of the user operation at the position determined on the basis of the position of the user terminal in the virtual space corresponding to the map information of the real space; the second arranging unit 12 arranges the second object with which the predetermined event is associated at the position determined on the basis of the position of the first object in the virtual space after the time determined in accordance with the first object elapses from the time when the first object is arranged; and the generating unit 13 generates the predetermined event in accordance with the positional condition regarding the position of the user terminal and the position of the second object. Therefore, it becomes possible to improve interest of the user in the video game.

Namely, by arranging the first object at the position determined on the basis of the position of the terminal 20 in the video game using the positional information of the terminal 20 and arranging the second object at the position determined on the basis of the position of the first object after the predetermined time elapses, it is possible to relate the position of the terminal 20 to arrangement of the objects to have variation in the arrangement of the objects, and as a result, it becomes possible to improve the interest of the user in the video game. Further; not only the user causes the server 10A to generate the event corresponding to the arranged object in advance regardless of game play by the user, but also the server 10A further arranges another object on the basis of the arranged object in response to a user operation. Therefore, it is possible to improve the variety of arrangement of the objects, and as a result, it becomes possible to improve the interest of the user in the video game.

Second Embodiment

Figure 6:
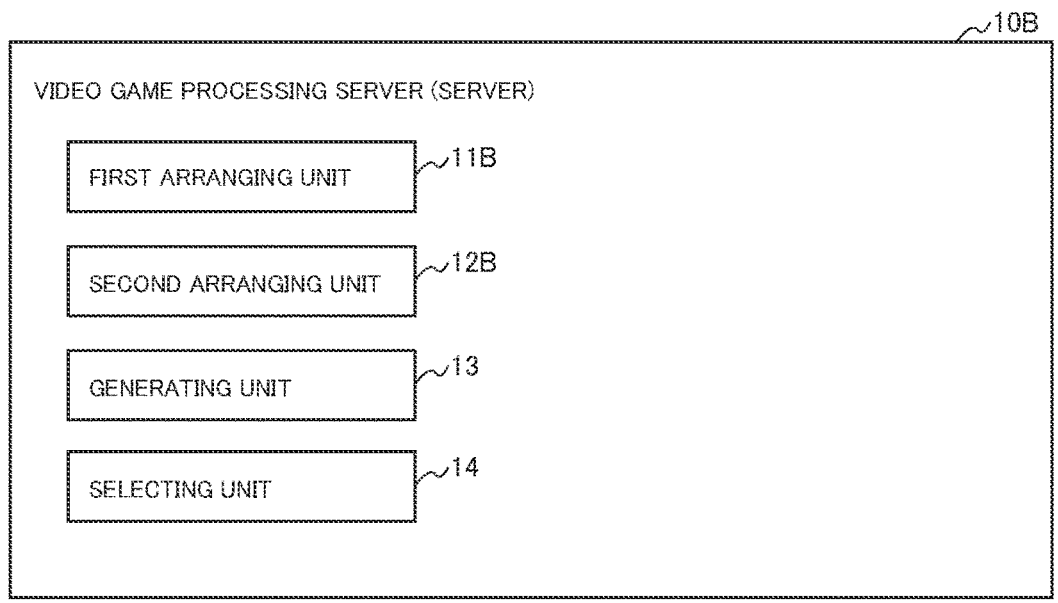
FIG. 6 is a block diagram illustrating a configuration of a server corresponding to at least one of the embodiments of the present disclosure.

FIG. 6 is a block diagram illustrating a configuration of a video game processing server 10B (hereinafter; referred to as a "server 10B"), which is an example of the video game processing server 10. In the present embodiment, the server 10B at least includes a first arranging unit 11B, a second arranging unit 12B, a generating unit 13, and a selecting unit 14.

The selecting unit 14 has a function to select a predetermined number of in-game elements from a plurality of in-game elements owned by a user in a video game on the basis of a user operation.

Here, the plurality of in-game elements owned by the user means a plurality of in-game elements for each of which the user has a right to use. The plurality of in-game elements owned by the user is not limited particularly. However, it is preferable to be in-game elements associated with one user. As an example of the in-game elements owned by the user, there are in-game elements for which only one user has a right to use.

Further; the in-game element means an element the user can use in the video game. The in-game element is not limited particularly. However, the in-game element may be an in-game element that has one use application, or may be an in-game element that has a plurality of use applications. As examples of the in-game element, there are an item and a point.

Further, a configuration to select the predetermined number of in-game elements on the basis of the user operation is not limited particularly. However; it is preferable that the selecting unit 14 is configured to select in-game elements selected by user in response to the user operation. As an example of the configuration to select the predetermined number of in-game elements on the basis of the user operation, there is an input operation against a user terminal 20 to select at least one in-game element with respect to list information on in-game elements displayed on a game screen.

The first arranging unit 11B has a function to arrange a first object with a type corresponding to the selected in-game element.

Here, the first object with the type corresponding to the in-game element means a first object that has a predetermined property or form corresponding to an in-game element. The first object of the type corresponding to the in-game element is not limited particularly. However, it is preferable that the first object is a first object that has a property or form related to an in-game element. As an example of the first object of the type corresponding to the in-game element, there is a first object with appearance related to an in-game element (for example, a first object with appearance at least part of which is similar to an image of an in-game element displayed on a game screen, or a first object with appearance on which character string indicating a property of an in-game element is displayed).

The second arranging unit 12B has a function to arrange a second object corresponding to the type of the arranged first object.

Here, the second object corresponding to the type of the first object means a second object that is determined in advance on the basis of a type of a first object. The second object corresponding to the type of the first object is not limited particularly. However, it is preferable that the second object is a second object related to a property or form of a first object. As an example of the second object corresponding to the type of the first object, there is a second object that is determined in accordance with a degree of rarity or a rank of a first object.

Figure 7:
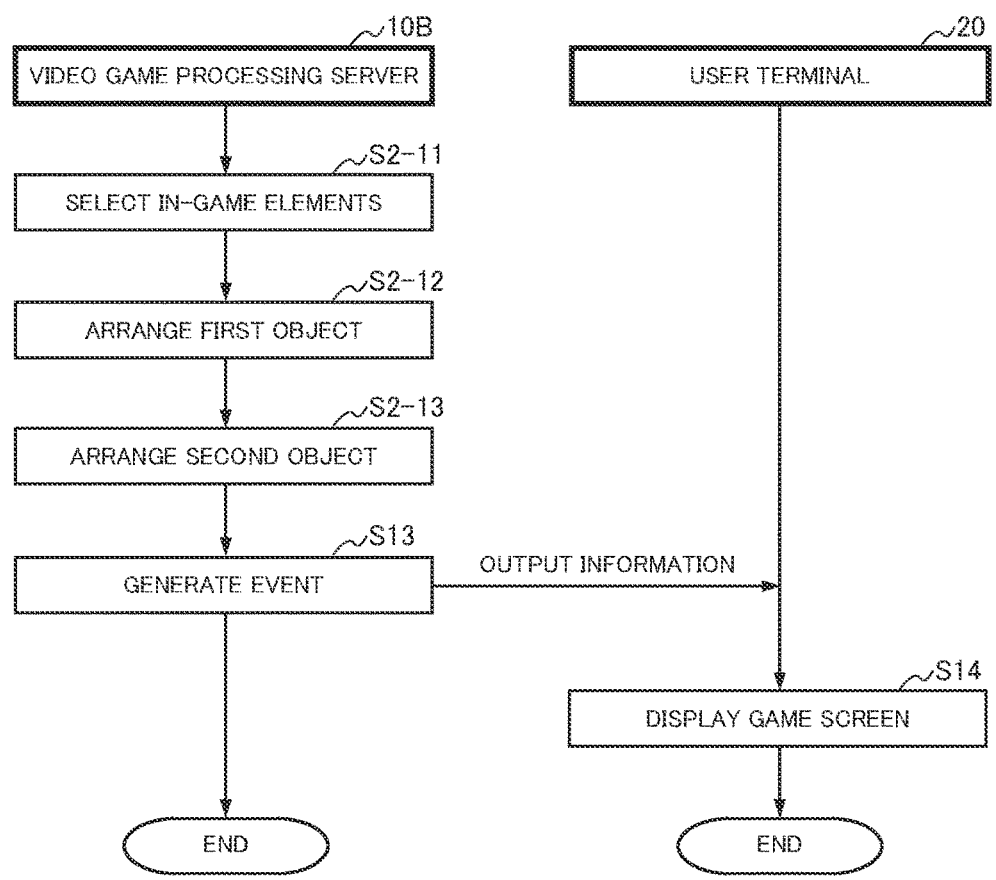
FIG. 7 is a flowchart illustrating an example of game processing corresponding to at least one of the embodiments of the present disclosure.

FIG. 7 is a flowchart illustrating an example of game processing executed by a video game processing system 100. Hereinafter, operations of the server 10B and the user terminal 20 (hereinafter, referred to as the "terminal 20") will be described as an example. In this regard, a flowchart illustrating an operation of each of the server 10B and the terminal 20 is omitted from a point of view to avoid repeated explanation.

In the game processing, the server 10B first selects a predetermined number of in-game elements from a plurality of in-game elements owned by the user in the video game on the basis of a user operation (Step S2-11). In the present embodiment, the server 10B stores information regarding the predetermined number of in-game elements thus selected in a predetermined storage region.

When the predetermined number of in-game elements is selected, the server 10B arranges a first object of a type corresponding to the selected in-game elements (Step S2-12). In the present embodiment, the server 10B stores information regarding the arranged first object and information regarding the arranged position in a predetermined storage region.

When the first object is arranged, the server 10B arranges a second object corresponding to the type of the arranged first object (Step S2-13). In the present embodiment, the server 10B stores information regarding the arranged second object and information regarding the arranged position in a predetermined storage region.

As explained above, as one aspect of the second embodiment, the server 10B that controls progress of the video game using positional information of the user terminal in response to the user operation is configured so as to at least include the first arranging unit 11B, the second arranging unit 12B, the generating unit 13, and the selecting unit 14. Thus, the selecting unit 14 selects the predetermined number of in-game elements from the plurality of in-game elements owned by the user in the video game on the basis of the user operation; the first arranging unit 11B arranges the first object with the type corresponding to the selected in-game element; and the second arranging unit 12B arranges the second object corresponding to the type of the arranged first object. Therefore, the user is allowed to be indirectly involved with which a first object and a second object are arranged, and as a result, it becomes possible to improve interest of the user in the video game.

Third Embodiment

Figure 8:
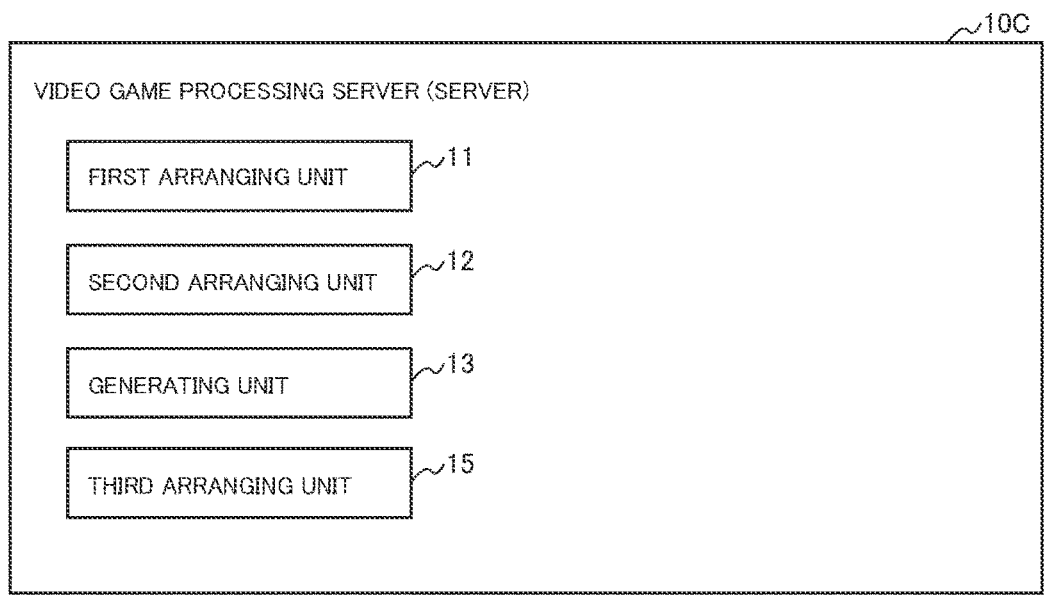
FIG. 8 is a block diagram illustrating a configuration of a server corresponding to at least one of the embodiments of the present disclosure.

FIG. 8 is a block diagram illustrating a configuration of a video game processing server 10C (hereinafter, referred to as a "server 10C"), which is an example of the video game processing server 10. In the present embodiment, the server 10C at least includes a first arranging unit 11, a second arranging unit 12; a generating unit 13, and a third arranging unit 15.

The third arranging unit 15 has a function to arrange a second object at a position to which a user terminal 20 (hereinafter, referred to as a "terminal 20") is required to move from a position of the terminal 20.

Here, the position to which the terminal 20 is required to move from the position of the terminal 20 means a position in a virtual space that corresponds to a position different from a current position of the terminal 20. The position to which the terminal 20 is required to move from the position of the terminal 20 is not limited particularly. However, it is preferable that the position is a position by which the terminal 20 is required to move by a predetermined distance or longer. As an example of the position to which the terminal 20 is required to move from the position of the terminal 20, there is a position where a positional condition with the terminal 20, which is a condition of generating an event by the generating unit 13, is not satisfied in a case where a second object is arranged.

Figure 9:
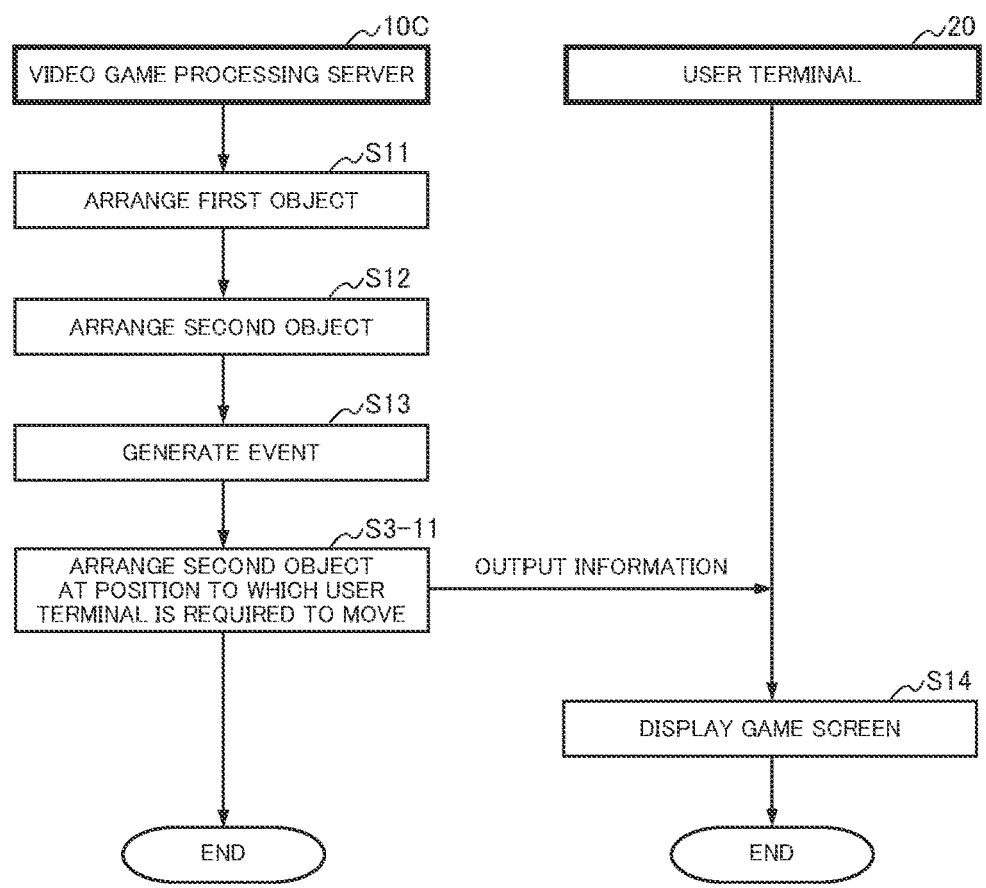
FIG. 9 is a flowchart illustrating an example of game processing corresponding to at least one of the embodiments of the present disclosure.

FIG. 9 is a flowchart illustrating an example of game processing executed by a video game processing system 100. Hereinafter, operations of the server 10C and the terminal 20 will be described as an example. In this regard, a flowchart illustrating an operation of each of the server 10C and the terminal 20 is omitted from a point of view to avoid repeated explanation.

When an event is generated, the server 10C arranges a second object at a position to which the terminal 20 is required to move from a position of the terminal 20 (Step S3-11). In the present embodiment, the server 10C stores information regarding the second object arranged at the position to which the terminal 20 is required to move from the position of the terminal 20 and information regarding the arranged position in a predetermined storage region.

As explained above, as one aspect of third embodiment, the server 10C that controls progress of the video game using positional information of the user terminal in response to the user operation is configured so as to at least include the first arranging unit 11, the second arranging unit 12, the generating unit 13, and the third arranging unit 15. Thus, the third arranging unit 15 arranges the second object at the position to which the terminal 20 is required to move from the position of the terminal 20. Therefore, it becomes possible to have variation in arrangement of objects in a positional information game in which an object is arranged at a position to which the terminal 20 is required to move.

Fourth Embodiment

Figure 10:
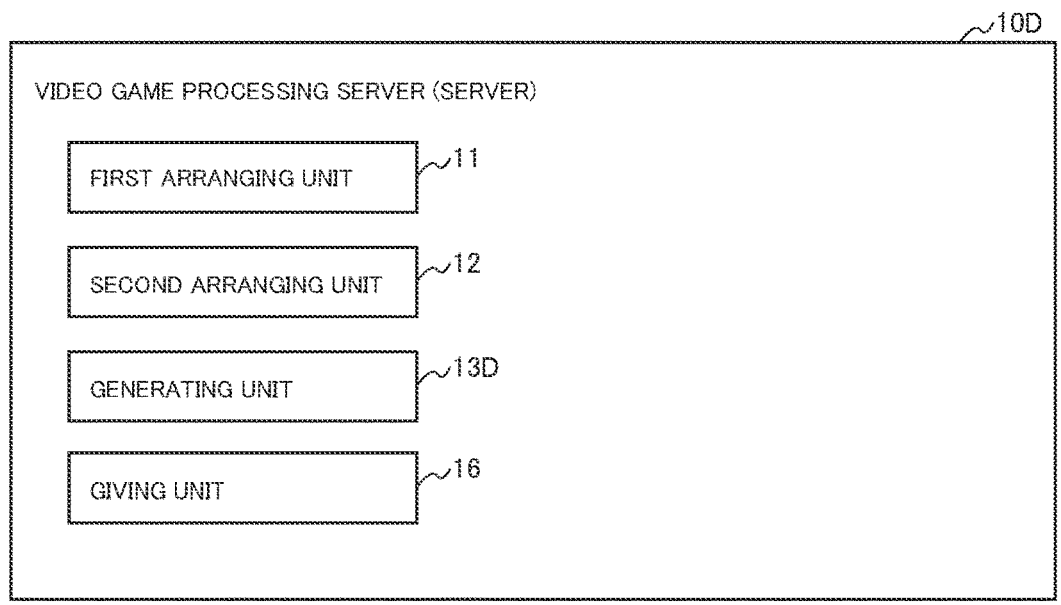
FIG. 10 is a block diagram illustrating a configuration of a server corresponding to at least one of the embodiments of the present disclosure.

FIG. 10 is a block diagram illustrating a configuration of a video game processing server 10D (hereinafter, referred to as a "server 10D"), which is an example of the video game processing server 10. In the present embodiment, the server 10D at least includes a first arranging unit 11, a second arranging unit 12, a generating unit 13D, and a giving unit 16.

The generating unit 13D has a function to generate an event via which a predetermined task is given to a user.

Here, the phrase "a predetermined task is given to a user" means that a task and a user are associated with each other. A configuration to give a task to a user is not limited particularly. However, it is preferable that the generating unit 13D is configured so that progress of a task and a user are associated with each other and the user can confirm the content and the progress of the task. As an example of the configuration to give a task to a user; there is a configuration in which a user is notified of the content of a task and the user can confirm progress of the task through a game screen.

Further the task means a problem that is imposed in a video game. The task is not limited particularly. However; it is preferable that the task is one in which the user can recognize an imposed problem. As an example of the task, there is a task that a predetermined event is completed a predetermined number of times in a virtual space.

The giving unit 16 has a function to give the user a privilege corresponding to the task in a case where the task is achieved.

Here, the privilege corresponding to the task means a privilege that is set to the task in advance. In a case where a plurality of tasks exists, a predetermined privilege is set to each of the plurality of tasks in advance. The privilege corresponding to the task is not limited particularly. However, it is preferable that the privilege is a privilege that corresponds to the content of a task and the difficulty level of achievement thereof. Examples of the privilege corresponding to the task, there are a privilege of a type according to the content of a task and a privilege whose value increases in a video game as the difficulty level of the task increases.

Further, the privilege means a privilege that is given to a user. The privilege may be an element that the user can use or an element that the user cannot use. The content of the privilege is not limited particularly. As examples of the privilege, there are an in-game element, a right in the video game (for example, a right of a predetermined character to become a companion of a user), and occurrence of a temporary process in the video game (for example, occurrence of a so-called buff, sharing of an item effect, or an increase in an item appearance rate).

Figure 11:
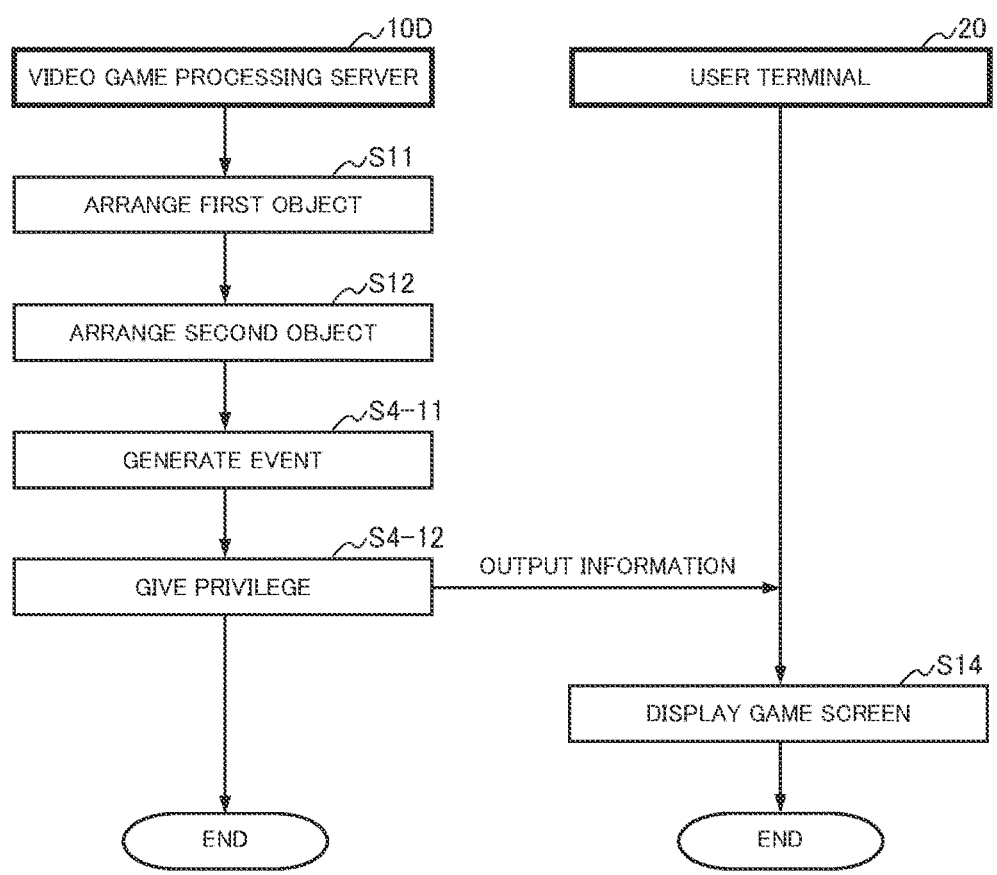
FIG. 11 is a flowchart illustrating an example of game processing corresponding to at least one of the embodiments of the present disclosure.

FIG. 11 is a flowchart illustrating an example of game processing executed by a video game processing system 100. Hereinafter, operations of the server 10D and a user terminal 20 (hereinafter, referred to as a "terminal 20") will be described as an example. In this regard, a flowchart illustrating an operation of each of the server 10D and the terminal 20 is omitted from a point of view to avoid repeated explanation.

When a second object is arranged, the server 10D generates an event via which a predetermined task is given to a user (Step S4-11). In the present embodiment, the server 10D stores information regarding the task and identification information of the user in a predetermined storage region so as to be associated with each other.

When the task is given to the user, the server 10D gives the user a privilege corresponding to the task in a case where the task is achieved (Step S4-12). In the present embodiment, in a case where the task is achieved, the server 10D transmits, to the terminal 20, output information for giving the user the privilege corresponding to the task.

As explained above, as one aspect of the fourth embodiment, the server 10D that controls progress of the video game using positional information of the user terminal in response to the user operation is configured so as to at least include the first arranging unit 11, the second arranging unit 12, the generating unit 13D, and the giving unit 16. Thus, the generating unit 13D generates the event via which the predetermined task is given to the user, and the giving unit 16 gives the user the privilege corresponding to the task in a case where the task is achieved. Therefore, by motivating generation of an event, it becomes possible to maintain interest of the user in the video game.

Fifth Embodiment

Figure 12:
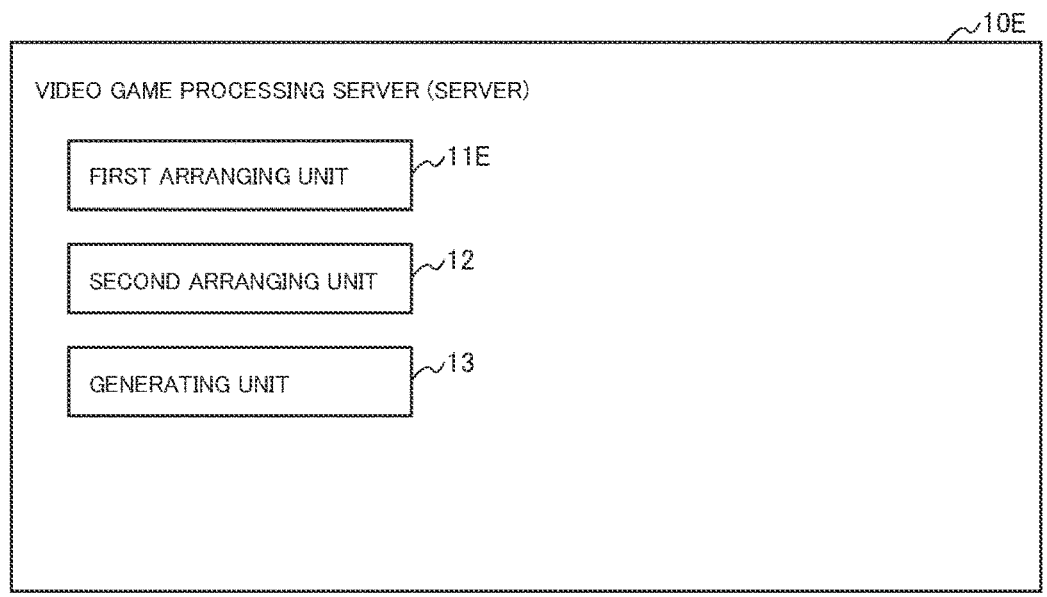
FIG. 12 is a block diagram illustrating a configuration of a server corresponding to at least one of the embodiments of the present disclosure.

FIG. 12 is a block diagram illustrating a configuration of a video game processing server 10E (hereinafter; referred to as a "server 10E"), which is an example of the video game processing server 10. In the present embodiment, the server 10E at least includes a first arranging unit 11E, a second arranging unit 12, and a generating unit 13.

The first arranging unit 11E has a function to restrict arrangement of first objects so that the number of the first objects arranged in a virtual space does not exceed a predetermined number.

Here, the phrase "restrict arrangement of first objects" means that restriction is set to arrangement of first objects. A configuration to restrict arrangement of first objects is not limited particularly. However, it is preferable that the first arranging unit 11E is configured so that the user can recognize that arrangement of the first objects is restricted. As examples of the configuration to restrict arrangement of first objects, there are a configuration in which arrangement of a new first object is prohibited in a case where the number of first objects exceeds a predetermined number due to arrangement of the new first object, and a configuration in which display of first objects is prohibited (for example, a first object is not displayed on a display screen even in a case where an area corresponding to the first object is included in a display area of a user terminal 20).

Figure 13:
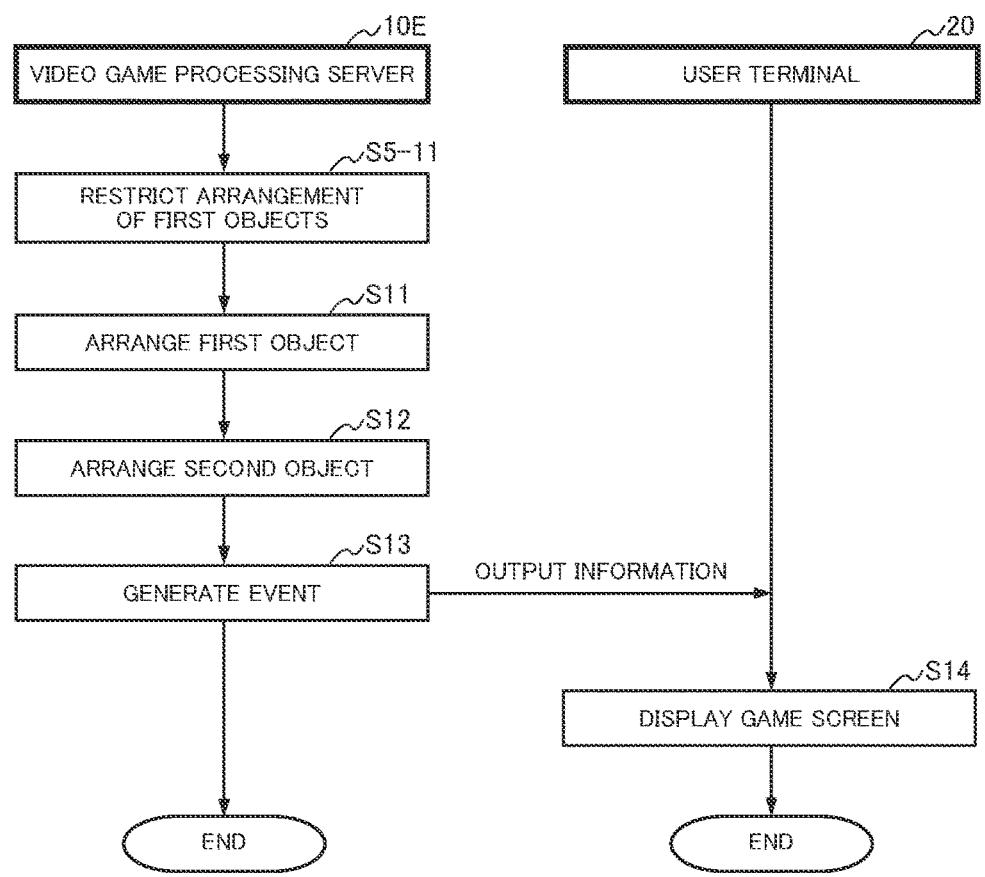
FIG. 13 is a flowchart illustrating an example of game processing corresponding to at least one of the embodiments of the present disclosure.

FIG. 13 is a flowchart illustrating an example of game processing executed by a video game processing system 100. Hereinafter, operations of the server 10E and the user terminal 20 (hereinafter, referred to as the "terminal 20") will be described as an example. In this regard, a flowchart illustrating an operation of each of the server 10E and the terminal 20 is omitted from a point of view to avoid repeated explanation.

In the game processing, the server 10E first restricts arrangement of first objects so that the number of first objects arranged in a virtual space does not exceed a predetermined number (Step S5-11). In the present embodiment, the server 10E prohibits arrangement of a new first object in a case where the number of the first objects arranged in the virtual space exceeds the predetermined number due to arrangement of the new first object.

As explained above, as one aspect of the fifth embodiment, the server 10E that controls progress of the video game using positional information of the user terminal in response to the user operation is configured so as to at least include the first arranging unit 11E, the second arranging unit 12, and the generating unit 13. Thus, the first arranging unit 11E restricts the arrangement of the first objects so that the number of the first objects arranged in the virtual space does not exceed the predetermined number. Therefore, compared with a case where arrangement of first objects is not restricted, for example, it is necessary to consider a type of each of first objects and the number of first objects to be arranged on the basis of a user operation, and as a result, it becomes possible to improve interest of the user in the video game.

Sixth Embodiment

Figure 14:
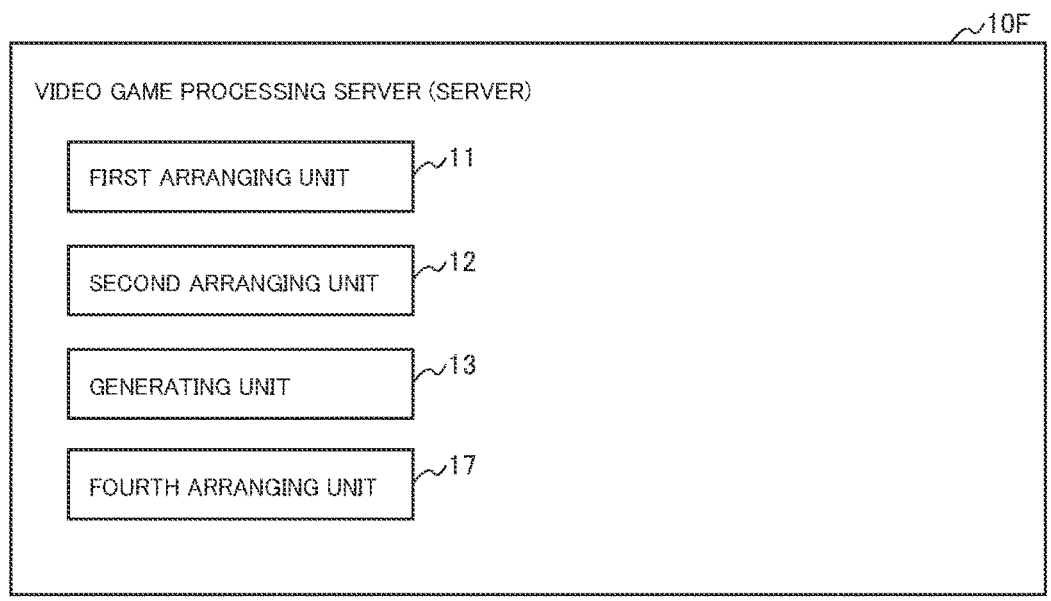
FIG. 14 is a block diagram illustrating a configuration of a server corresponding to at least one of the embodiments of the present disclosure.

FIG. 14 is a block diagram illustrating a configuration of a video game processing server 10F (hereinafter, referred to as a "server 10F"), which is an example of the video game processing server 10. In the present embodiment, the server 10F at least includes a first arranging unit 11F, a second arranging unit 12, a generating unit 13, and a fourth arranging unit 17.

The fourth arranging unit 17 has a function to arrange a third object in a case where a predetermined condition is satisfied. At least an effect by the third object that a user can obtain depending upon a corresponding event is different from that by a second object.

Here, the predetermined condition is not limited particularly. However, it is preferable that the predetermined condition is a condition in which the user can recognize that the condition is satisfied. As examples of the predetermined condition, there are a condition that a predetermined time elapses and a condition that a predetermined event is generated.

Further, the effect means an event that is generated in a video game. The content of the effect is not limited particularly. However; it is preferable that generation of the effect can be recognized by the user. As examples of the effect, there are one by which progress of video game becomes advantageous, and one that influences on another user. In this regard, the effect may include that a predetermined task is given to the user or that a privilege corresponding to a task is given to the user in a case where the task is achieved. Further, it is preferable that the fourth arranging unit 17 is configured so that a type of the effect obtained by the event corresponding to the third object is different from that of the effect obtained by the event corresponding to the second object. Further, the fourth arranging unit 17 may be configured so that the effect obtained by the event corresponding to the second object is an influence on the user, and the effect obtained by the event corresponding to the third object is an influence on another user other than the user (an indirect influence on the user (for example, an influence on a virtual space)) or an influence on the other user.

Further, the phrase "arrange a third object" means that a third object and a position in the virtual space are associated with each other. A configuration to arrange a third object is not limited particularly. However, it is preferable that the fourth arranging unit 17 is configured so that a third object is arranged so as to be capable of being displayed on a display screen of a user terminal 20 in a case where a position at which the third object is arranged or an area including the position and corresponding to the third object is included in a display area of the user terminal 20.

Figure 15:
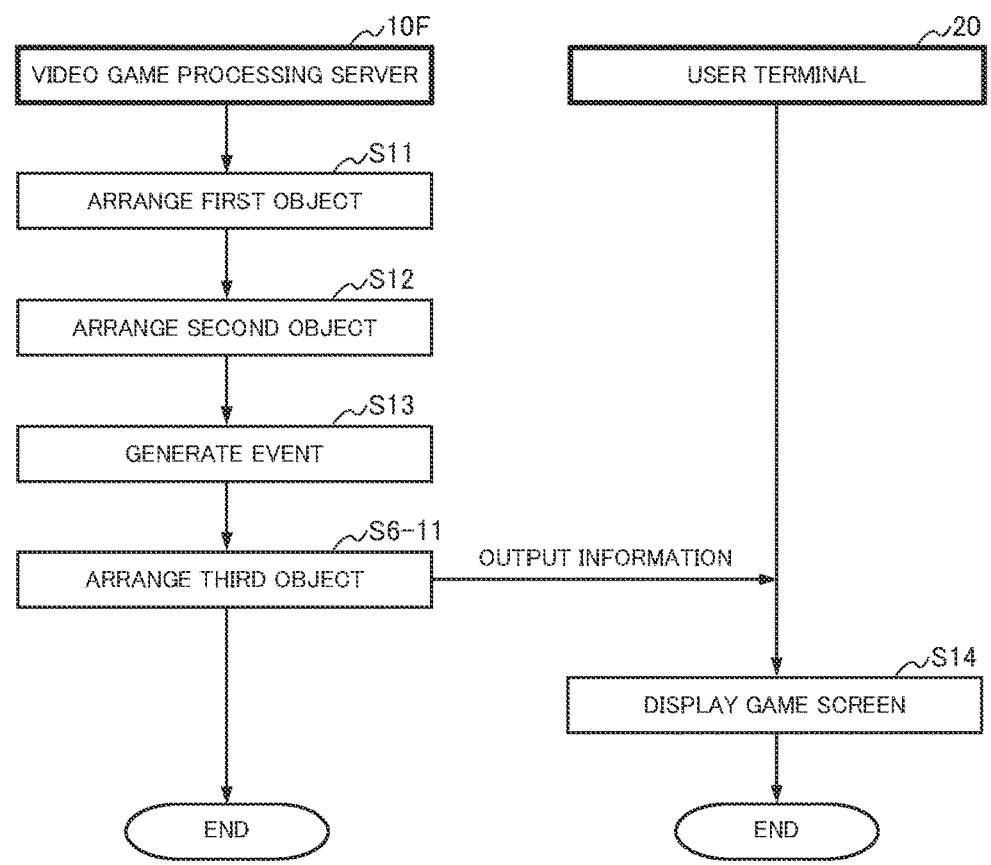
FIG. 15 is a flowchart illustrating an example of game processing corresponding to at least one of the embodiments of the present disclosure.

FIG. 15 is a flowchart illustrating an example of game processing executed by a video game processing system 100. Hereinafter, operations of the server 10F and the user terminal 20 (hereinafter, referred to as the "terminal 20") will be described as an example. In this regard, a flowchart illustrating an operation of each of the server 10F and the terminal 20 is omitted from a point of view to avoid repeated explanation.

In a case where a predetermined condition is satisfied after an event is generated, the server 10F arranges a third object at least whose effect is different from an effect obtained by the user depending upon an event corresponding to a second object (Step S6-11). In the present embodiment, the server 10F arranges the third object after an elapse of a predetermined time, and transmits, to the terminal 20, output information for outputting a game screen.

As explained above, as one aspect of the sixth embodiment, the server 10F that controls progress of the video game using positional information of the user terminal in response to the user operation is configured so as to at least include the first arranging unit 11F, the second arranging unit 12; the generating unit 13, and the fourth arranging unit 17. Thus, the fourth arranging unit 17 arranges the third object at least whose effect is different from the effect obtained by the user depending upon the event corresponding to the second object in the predetermined condition is satisfied. Therefore, it is also possible for the effect of the object to have variation, and as a result, it becomes possible to improve interest of the user in the video game.

Seventh Embodiment

Figure 16:
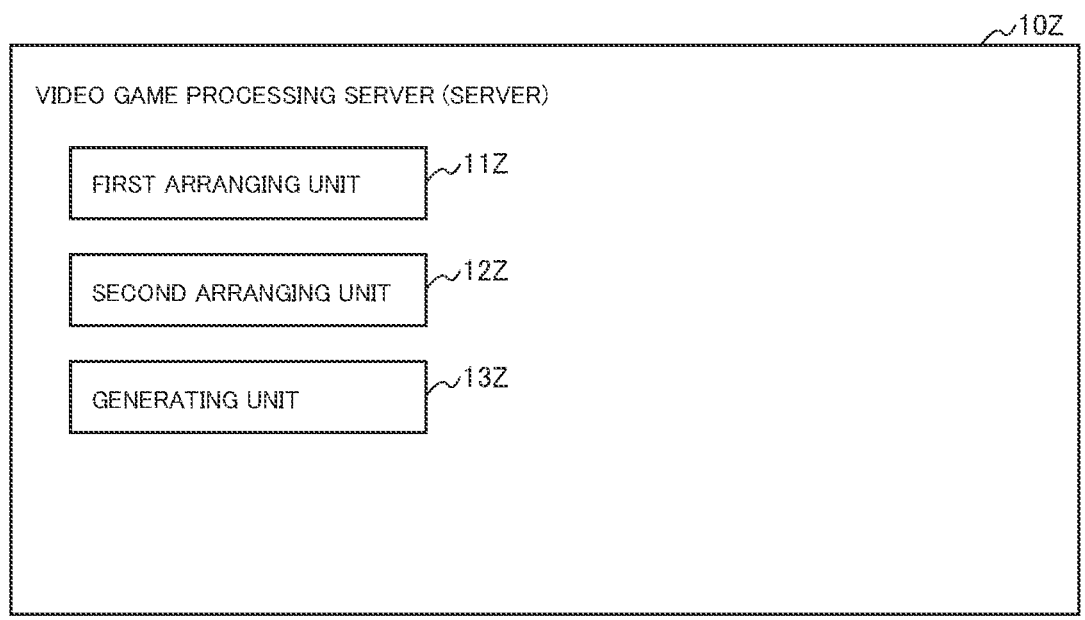
FIG. 16 is a block diagram illustrating a configuration of a server corresponding to at least one of the embodiments of the present disclosure.

FIG. 16 is a block diagram illustrating a configuration of a video game processing server 10Z (hereinafter, referred to as a "server 10Z"), which is an example of the video game processing server 10 in the video game processing system 100 (see FIG. 1). In the present embodiment, the server 10Z at least includes a first arranging unit 11Z, a second arranging unit 12Z, and a generating unit 13Z.

The first arranging unit 11Z has a function to arrange an object determined on the basis of a user operation (hereinafter, referred to as a "first object") at a position determined on the basis of a position of a user terminal (in the present embodiment, a user terminal 20) in a virtual space corresponding to map information of a real space.

Here, the virtual space corresponding to the map information of the real space means a virtual space that is generated by using the map information of the real space. Hereinafter, a configuration in which a virtual space is generated by respectively arranging objects corresponding to a road, a building, and the like in a real space at positions corresponding to the real space will be described as an example.

Further, the user operation means an input operation to the user terminal 20 by the user.

The user operation is not limited particularly. However, it is preferable that the user operation is an input operation for selection by the user. Hereinafter; a case where an input operation to select any type of food item from food items owned by the user is received from the user will be described as an example.

Further, the first object determined on the basis of the user operation means an object to be used in the video game, for example, an object that is defined by selecting one from a plurality of objects by means of a user operation. Further, the object means a virtual object or subject that appears in the video game. In the present embodiment, the first object is an object corresponding to a food item selected by the user (that is, a food object).

Further; a configuration to define a first object on the basis of a user operation is not limited particularly. However, it is preferable that the first arranging unit 11 is configured so that the user can recognize which first object is selected. In the present embodiment, a list of the number of possessed food items is displayed on a game screen, and the user is caused to select any food item.

Further, the position of the user terminal 20 means a position indicated by positional information of the user terminal 20. The positional information of the user terminal 20 means information indicating a position in the real space. Hereinafter, a configuration in which positional information using GPS signals is positional information of the user terminal 20 will be described as an example.

Further, the position determined on the basis of the position of the user terminal 20 means a position that is determined based on a position in the virtual space corresponding to the position of the user terminal 20 in the real space. In the present embodiment, the position in the virtual space corresponding to the position of the user terminal 20 in the real space is a position of a user character, and a position around the user character is defined as an arrangement position of a food object.

Further, the phrase "arrange the first object" means that the first object is associated with a position in the virtual space. In the present embodiment, in a case where the food object and the position in the virtual space are associated with each other and an area corresponding to the food object is included in a display area of the user terminal 20, the food object is displayed on a display screen of the user terminal 20. The display area of the user terminal 20 herein is an area around the position in the virtual space corresponding to the position of the user terminal 20 in the real space (the position of the user character). In this regard, an upper limit of the number of food objects that are arranged at the same time may be provided. Hereinafter, a case where the food object is arranged in the virtual space will be described as an example.

The second arranging unit 12Z has a function to arrange an object with which a predetermined event is associated (hereinafter, referred to as a "second object") at a position determined on the basis of a position of the first object in the virtual space after a time determined in accordance with the first object elapses from a time when time when the first object is arranged.

Here, the time determined in accordance with the first object means a time that is set to the first object in advance. In the present embodiment, a time according to a type of food object is defined. In this regard, the higher the type of food object becomes, the longer the defined time becomes.

Further, the second object with which the predetermined event is associated means an object that is to be used in the video game and is associated with an event in the video game. In the present embodiment, the second object is a monster object, and an event corresponds to a type of the monster object.

Further, the event means any of various kinds of occurrences that can be generated in the video game. In the present embodiment, the event corresponding to the monster object is an event in which a request is received from a monster (that is, a task is given). In this regard, as examples of the task given from the monster, there is a task that a predetermined enemy monster is defeated a predetermined number of times, and a task that a recovery spot (or a pot) is touched a predetermined number of times. In this regard, the second arranging unit 12Z may be configured so as to give, in a case where a task is achieved, the user a privilege regarding a predetermined event generated after achievement of the task. In the present embodiment, in a case where the task given from the monster is achieved, the monster becomes a "friend". When the monster becomes the "friend", the user character can receive a predetermined buff effect or the like in a bathe event.

Further, the position determined on the basis of the position of the first object means a position that is determined based on the position of the first object in the virtual space. The position determined on the basis of the position of the first object is not limited particularly. However, it is preferable that the position is a position equal to or less than a predetermined distance from the position of the first object. In the present embodiment, the monster object is arranged at the position equal to or less than the predetermined distance from the position of the food object (that is, a position around the food object).

Further, the phrase "arrange the second object" means that a second object and a position in the virtual space are associated with each other. In the present embodiment, the monster object and the position in the virtual space are associated with each other, and in a case where an area corresponding to the monster object is included in the display area of the user terminal 20, the monster object is displayed on the display screen of the user terminal 20.

Hereinafter; a configuration in which a monster object is arranged in the vicinity of a food object after a predetermined time elapses from a time when the food object is arranged will be described as an example.

In this regard, in the present embodiment, the second arranging unit 12Z may be configured so as to arrange a third object at least whose effect is different from the effect obtained by the user depending upon the event corresponding to the monster object that is the second object. For example, the second arranging unit 12Z may be configured so that the effect obtained by the event corresponding to the third object is acquisition of an experience value by a battle against a monster and the effect obtained by the event corresponding to the second object is that the monster becomes a friend or that a benefit is given to the user or another user who exists in the vicinity of the second object.

The generating unit 13Z has a function to generate an event in accordance with a positional condition regarding the position of the user terminal 20 and the position of the second object.

Here, the positional condition regarding the position of the user terminal 20 and the position of the second object means a condition including that the position of the user terminal 20 and the position of the second object have a predetermined relationship. Hereinafter, a case where the positional condition is a condition that a distance between the user character and the monster object is equal to or less than a predetermined length will be described as an example. In this regard, the generating unit 13Z may be configured so as to generate the event in a case where a condition other than the positional condition is satisfied. For example, the generating unit 13Z may be configured so as to generate the event in a case where the positional condition is satisfied and the user carries out a selection operation against the monster object.

Further, the event generated in accordance with the positional condition is not limited particularly. However, it is preferable that such an event is an event corresponding to the second object. As described above, in the present embodiment, the event generated in accordance with the positional condition is an event for which a request is received from the monster.

FIG. 17 is an explanatory drawing for explaining an example of a storage state of information stored in a storage unit included in the server 10Z (not illustrated in the drawings). As illustrated in FIG. 17, as information regarding arrangement of the first and second objects, an in-game element, a first object, an arrangement time, and a second object are stored in the storage unit so as to be associated with each other as object related information. The object related information illustrated in FIG. 17 is information regarding the arrangement of the first object and the second object.

The in-game element herein means an element that the user can use in the video game. A type of the in-game element contained in the object related information is not limited particularly. However, it is preferable that the user who views the first object can recognize the type of the in-game element. In the present embodiment, the in-game element contained in the object related information is various kinds of "food items" each of which the user can own as an item in the video game.

Further, the first object means a virtual object that appears in the video game. A type of the first object contained in the object related information is not limited particularly. However, it is preferable that the user can recognize the type of the first object. In the present embodiment, the first object contained in the object related information is a food object.

Further, the arrangement time means a period of time from a time when the first object is arranged to a time when the second object is arranged. In the present embodiment, a different time is set in accordance with a type of the food object.

Further, the second object means a virtual object that appears in the video game. A type of the second object contained in the object related information is not limited particularly. However, it is preferable that the user can recognize the type of the second object. In the present embodiment, the second object contained in the object related information is a monster object.

In this regard, information regarding the objects may be managed together with objects each of which is not arranged as the first object or the second object. In that case, information indicating whether an object is arranged as the first object or the second object may be stored in the storage unit 20 as the object related information so as to be associated with the corresponding object, for example.

FIG. 18 is a flowchart illustrating an example of game processing executed by user's a video game processing system 100Z (hereinafter; referred to as a "system 100Z") provided with the server 10Z. In the game processing according to the present embodiment, processes related to a control of progress of a video game using the positional information of the user terminal 20 (hereinafter, referred to as the "terminal 20") in response to an operation of the user are executed. Hereinafter, each of the processes will be described. In this regard, the order of the processes may be changed without any contradiction or the like of processing content.

The game processing is started as an opportunity that the terminal 20 accessing the server 10Z requests display of a game screen, for example.

In the game processing, the system 100Z first receives a selection operation for an in-game element by the user (Step S301). In the present embodiment, the system 100Z receives a selection operation against information regarding a plurality of food items displayed on the game screen from the user.

When the selection operation is received, the system 100Z selects an in-game element on the basis of the selection operation (Step S302). In the present embodiment, the system 100Z selects any food item on the basis of the selection operation against the information regarding the plurality of food items.

When the in-game element is selected, the system 100Z arranges a first object determined on the basis of a user operation at a position determined on the basis of a position of the terminal 20 in a virtual space corresponding to map information of a real space (Step S303). In the present embodiment, the system 100Z stores information regarding an arranged food object and information regarding an arranged position in a predetermined storage region.

When the first object is arranged, the system 100Z arranges a second object with which a predetermined event is associated at a position determined on the basis of a position of the first object in the virtual space after a time determined in accordance with the first object elapses from a time when the first object is arranged (Step S304). In the present embodiment, the system 100Z stores information regarding an arranged monster object and information regarding an arranged position in a predetermined storage region.

When the second object is arranged, the system 100Z generates the predetermined event via which a predetermined task is given to the user in accordance with a positional condition regarding the position of the terminal 20 and the position of the second object (Step S305). In the present embodiment, the system 100Z generates an event in which a request is received from a monster (or a task corresponding to the monster is given to the user). Further, in the present embodiment, the system 100Z stores information indicating the content of the task, progress of the task, and identification information of the user in a predetermined storage region so as to be associated with each other.

When the event is generated, the system 100Z gives the user a privilege corresponding to the task in a case where the task is achieved (Step S306). In the present embodiment, the system 100Z causes the monster to which the task is given to become a "friend" of the user in a case where the task is achieved.

In the present embodiment, when the privilege is given to the user, the system 100Z terminates the processes herein.

Figure 19A:
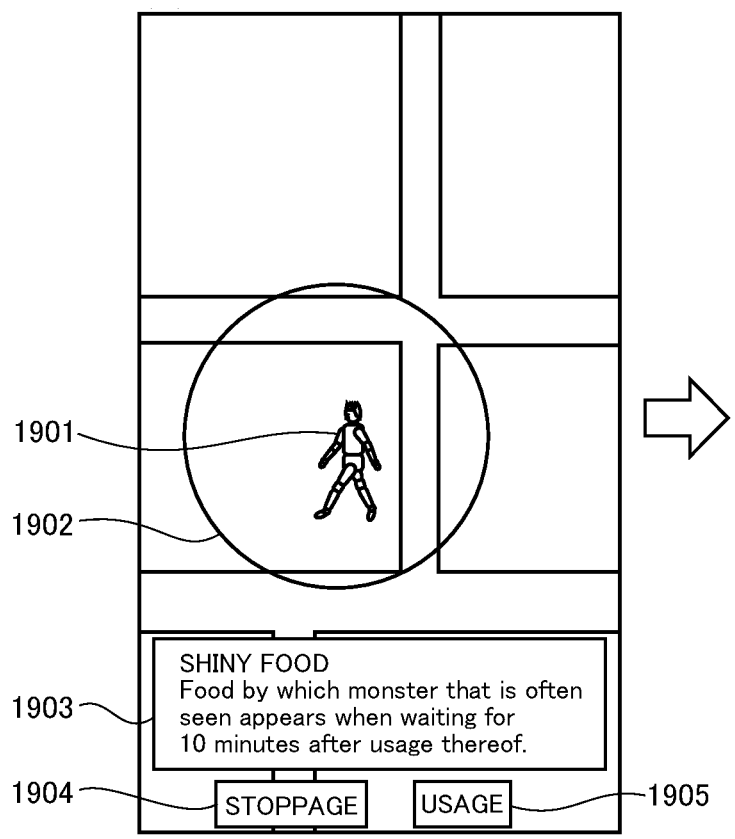
FIGS. 19A and 19B are explanatory drawings illustrating an example of the display screen corresponding to at least one of the embodiments of the present disclosure.
Figure 19B:
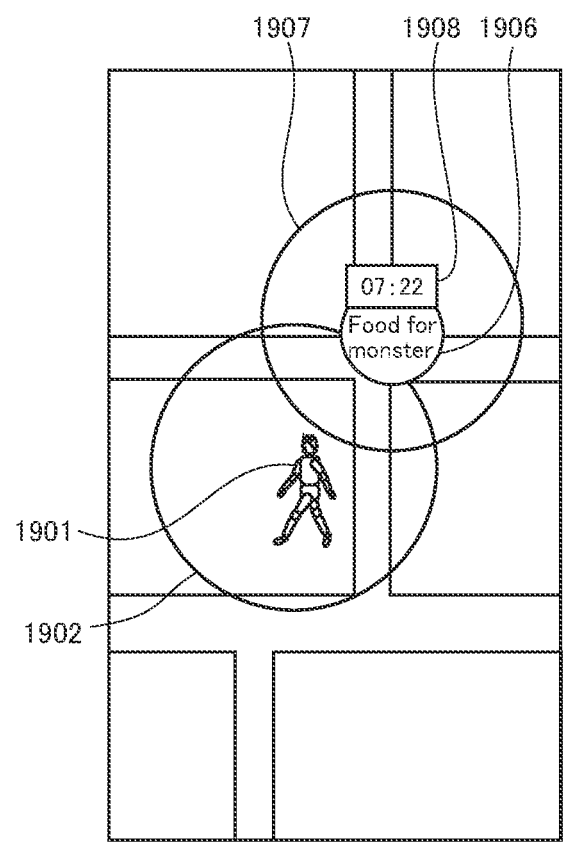

FIGS. 19A and 19B are explanatory drawings for explaining an example of a game screen. A character 1901 of a user, an event generable area 1902 based on a position of the character 1901, a text display area 1903, a stoppage button 1904, and a usage button 1905 are illustrated on the game screen of FIG. 19A.

The character 1901 is an image indicating a character of the user. The character 1901 is displayed at a position in a virtual space near the center of a display screen. The position corresponds to positional information of the terminal 20. When the position of the terminal 20 changes in the real space, the character 1901 similarly moves in the virtual space. Further, the event generable area 1902 also moves in accordance with movement of the character 1901.

The event generable area 1902 is an area where a positional condition, which is included in conditions for generating an event corresponding to the object, is satisfied. The positional condition is that the position of the terminal 20 and the position of the object have a predetermined relationship.

The text display area 1903 is an area for displaying a text regarding progress of the video game. A text for explaining a "shiny food" that is a kind of food item is displayed in FIG. 19A. The stoppage button 1904 is a button for selecting not to use the food item. The usage button 1905 is a button for selecting to use the food item, FIG. 19B is a game screen in a case where the user selects the usage button 1905 to use the "shiny food" in a state illustrated in FIG. 19A. The character 1901 of the user, the event generable area 1902, a food 1906, a food corresponding area 1907, and a second object arrangement time 1908 are illustrated on the game screen of FIG. 19B.

The food 1906 is a food object corresponding to the "shiny food", and is displayed in the vicinity of the character 1901.

The food corresponding area 1907 is an area where a monster object corresponding to the food 1906 is arranged. The food corresponding area 1907 is provided around the food 1906.

The second object arrangement time 1908 is a remaining time until the monster object corresponding to the food 1906 is arranged. The second object arrangement time 1908 is displayed at a position where the user can recognize that the monster object corresponds to the food 1906.

Figure 20A:
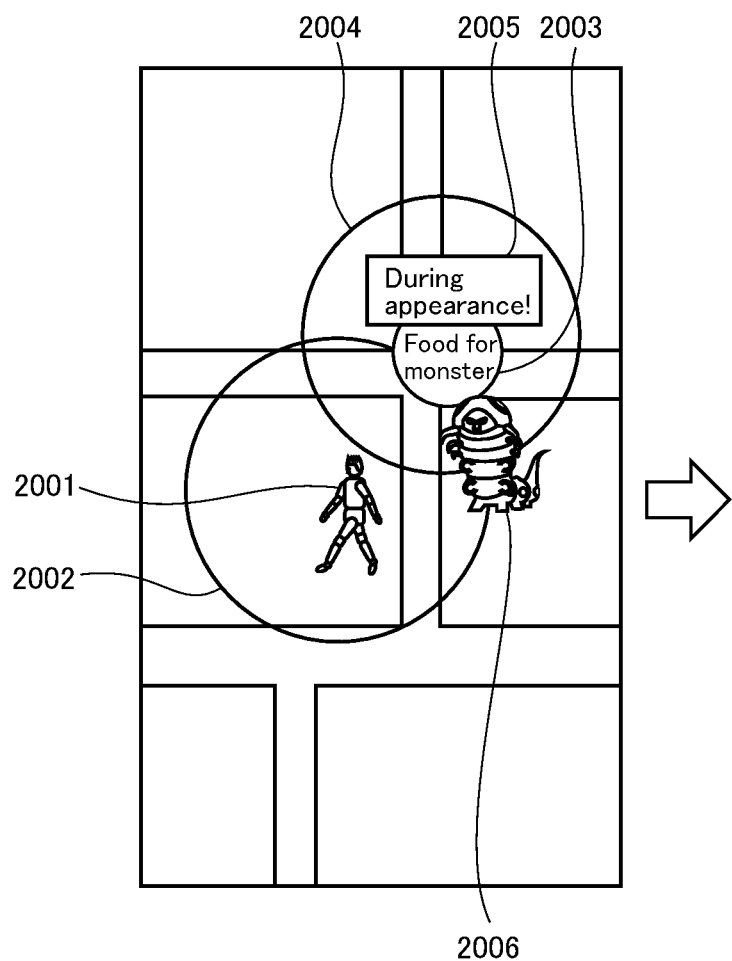
FIGS. 20A and 20B are explanatory drawings illustrating another example of the display screen corresponding to at least one of the embodiments of the present disclosure.
Figure 20B:
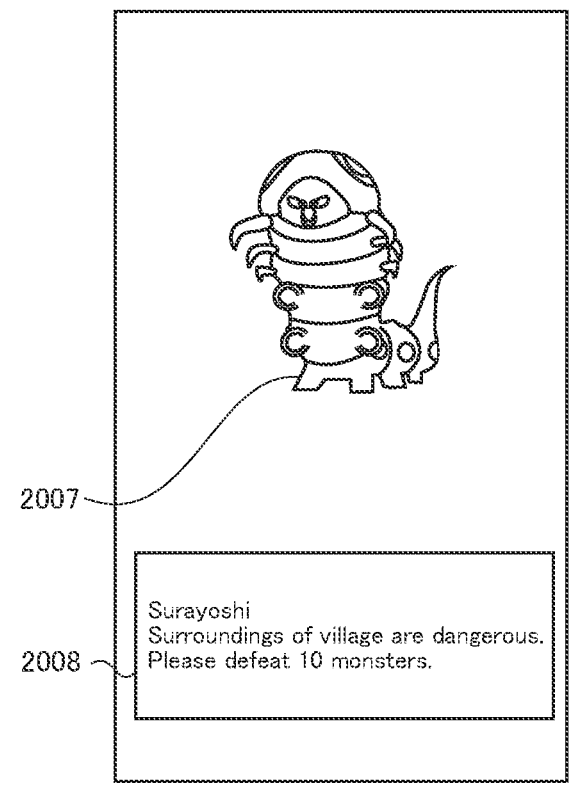

FIGS. 20A and 20B are explanatory drawings for explaining another example of the game screen. FIG. 20A is a game screen in a case where the remaining time until the monster object corresponding to the food 1906 is arranged elapses in a state illustrated in FIG. 19B. A character 2001 of the user, an event generable area 2002, a food 2003, a food corresponding area 2004, a second object arrangement time 2005, and a monster 2006 are illustrated on the game screen of FIG. 20A.

The character 2001 and the event generable area 2002 respectively correspond to the character 1901 and the event generable area 1902 in FIG. 19, and the food 2003 and the food corresponding area 2004 respectively correspond to the food 1906 and the food corresponding area 1907.

The monster 2006 is a monster object corresponding to the food 1906. When the monster 2006 is positioned within the event generable area 2002 and a touch operation against the monster 2006 is carried out, a predetermined event is generated, FIG. 20B is a game screen in a case where the touch operation against the monster 2006 is carried out in a state illustrated in FIG. 20A and an event in which a request is received from the monster is generated. A monster image 2007 and a text display area 2008 are illustrated on the game screen of FIG. 20B.

The monster image 2007 is an image corresponding to the monster 2006. The monster image 2007 may be an image having the same appearance as that of the monster 2006, or may be an image in which a part or all thereof is different from that of the monster 2006.

The text display area 2008 is an area for displaying a text that explains the content of the request received from the monster. As illustrated in FIG. 20B, a text for explaining a task to be achieved is displayed in the text display area 2008.

Figure 21A:
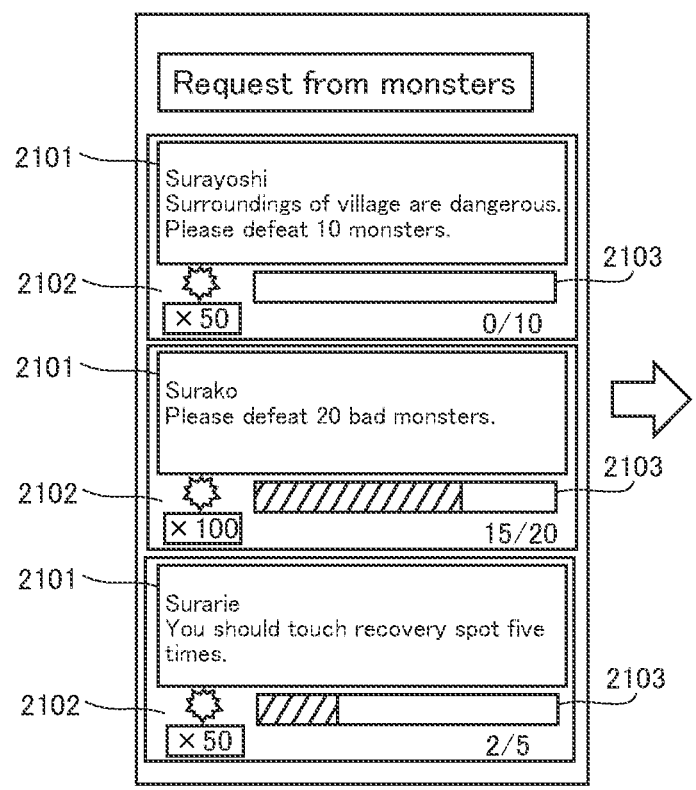
FIGS. 21A and 21B are explanatory drawings illustrating still another example of the display screen corresponding to at least one of the embodiments of the present disclosure.
Figure 21B:
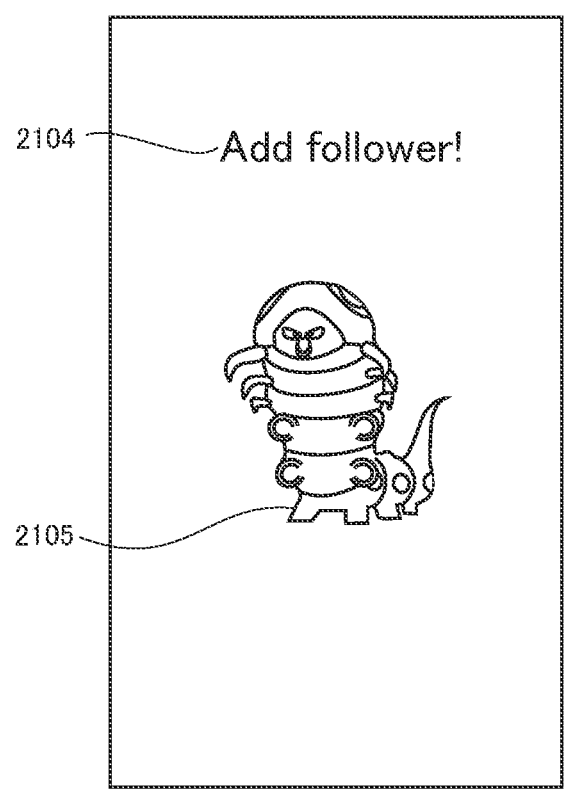

FIGS. 21A and 21B are explanatory drawings for explaining still another example of the game screen. Text display areas 2101, privilege display areas 2102, and progress display areas 2103 are illustrated on a game screen of FIG. 21A.

Each of the text display areas 2101 is an area for displaying a text that explains the content of the request received from the monster. A text for explaining the content of each request (the content of a task to be achieved) is displayed in each of the text display areas 2101.

The privilege display areas 2102 is an area for displaying the content of a part of a privilege to be given to the user in a case where the task is achieved. An icon of an item and the number of items are displayed in each of the privilege display areas 2102.

Each of the progress display areas 2103 is an area for displaying a progress status of each request (each task). A progress ratio to achievement is illustrated in each of the progress display areas 2103.

A text display area 2104 and a privilege display area 2105 are illustrated on a game screen of FIG. 21B. FIG. 21B is a game screen in a case where the task illustrated in FIG. 21A is achieved and a privilege is given.

The text display area 2104 is an area where a text indicating that the privilege is given is displayed. A text for transmitting that a friend is added to the user is displayed in the text display area 2104.

The privilege display area 2105 is an area for displaying an image of a part of the given privilege. An image of the friend added to the user is illustrated in each of the privilege display areas 2102.

As explained above, as one aspect of the seventh embodiment, the server 10Z that controls progress of the video game using positional information of the user terminal in response to the user operation is configured so as to at least include the first arranging unit 11Z, the second arranging unit 12Z, and the generating unit 13Z. Thus, the first arranging unit 11Z arranges the first object (the food object) determined on the basis of the user operation at the position determined on the basis of the position of the user terminal in the virtual space corresponding to the map information of the real space; the second arranging unit 12Z arranges the second object (the monster object) with which the predetermined event is associated at the position determined on the basis of the position of the first object in the virtual space after the time determined in accordance with the first object elapses from the time when the first object is arranged; and the generating unit 13Z generates the predetermined event (the event in which the request is received) in accordance with the positional condition regarding the position of the user terminal and the position of the second object. Therefore, it becomes possible to improve interest of the user in the video game.

Namely, compared with a case where the video game is caused to proceed depending upon generation of an event corresponding to an object arranged in advance regardless of game play by the user or a case where the user arranges an object and generates an event corresponding to the object, it is possible for the user to use the in-game element (the food item) to arrange the first object (the food object) and call the second object (the monster object). Therefore, it is possible to improve the variety of arrangement of the objects, and as a result, it becomes possible to improve the interest of the user in the video game.

Further, in the example of the seventh embodiment described above, the server 10Z may be configured so as to select a predetermined number of in-game elements from a plurality of in-game elements owned by the user in the video game on the basis of a user operation; arranges a first object of a type corresponding to the selected in-game element; and arranges a second object corresponding to the type of the arranged first object. Therefore, the user is allowed to be indirectly involved with which a first object and a second object are arranged, and as a result, it becomes possible to improve the interest of the user in the video game.

Further, in the example of the seventh embodiment described above, the server 10Z may be configured so as to arrange a second object at a position to which the terminal 20 is required to move from a position of the terminal 20. Therefore, it becomes possible to have variation in arrangement of objects in a positional information game in which an object is arranged at a position to which the terminal 20 is required to move.

Further, in the example of the seventh embodiment described above, the server 10Z may be configured so as to generate an event via which a predetermined task is given to the user, and give the user a privilege corresponding to a task in a case where the task is achieved. Therefore, by motivating generation of an event, it becomes possible to maintain interest of the user in the video game.

Further, in the example of the seventh embodiment described above, the server 10Z may be configured so as to restrict arrangement of first objects so that the number of first objects arranged in the virtual space does not exceed a predetermined number. Therefore, compared with a case where arrangement of first objects is not restricted, for example, it is necessary to consider a type of each of first objects and the number of first objects to be arranged on the basis of a user operation, and as a result, it becomes possible to improve interest of the user in the video game.

Further, in the example of the seventh embodiment described above, the server 10Z may be configured so as to arrange a third object at least whose effect is different from an effect obtained by the user depending upon an event corresponding to a second object in a case where a predetermined condition is satisfied. Therefore, it is also possible to have variation in the effect of the object, and as a result, it becomes possible to improve interest of the user in the video game.

Further, it has not been mentioned particularly in the example of the seventh embodiment described above. However, the server 10Z may be configured so as to restrict arrangement of first objects so that the number of first objects arranged in the virtual space does not exceed a predetermined number, and delete one first object or some first objects arranged in the virtual space on the basis of a user operation. Here, the phrase "delete one first object or some first objects" means that the first object(s) is set to a state of not being displayed by the terminal 20. A configuration to delete one first object or some first objects is not limited particularly. There are a configuration in which the terminal 20 is caused not to display a first object even in a case where the first object is positioned within a display area of the terminal 20, and a configuration in which a first object is removed from a virtual space (that is, a target first object is set to a state of not being displayed in the virtual space). By configuring the server 10Z in this manner, it is possible to cause the user to flexibly consider a type of each of first objects and the number of first objects arranged on the basis of a user operation while restriction is provided, and as a result, it becomes possible to improve interest of the user in the video game.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20; and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following embodiments can be at least performed by a person having a normal skill in the art to which the present disclosure belongs.

(1)

A non-transitory computer-readable medium including a video game processing program for causing a server to perform functions to control progress of a video game using positional information of a user terminal of a user in response to a user operation, the functions comprising:
- a first arranging function configured to arrange an object determined on a basis of a user operation as a first object at a position determined on a basis of a position of the user terminal in a virtual space corresponding to map information of a real space;
- a second arranging function configured to arrange an object with which a predetermined event is associated at a position determined on a basis of a position of the first object as a second object in the virtual space after a time determined in accordance with the first object elapses from a time when the first object is arranged; and
- a generating function configured to generate the predetermined event in accordance with a positional condition regarding the position of the user terminal and a position of the second object.

(2)

The non-transitory computer-readable medium according to (1), the functions further comprising:
- a selecting function configured to select a predetermined number of in-game elements from a plurality of in-game element owned by the user in the video game on a basis of the user operation,
- wherein the first arranging function includes a function configured to arrange the first object of a type corresponding to the selected in-game element, and
- wherein the second arranging function includes a function configured to arrange the second object corresponding to the type of the arranged first object.

(3)

The non-transitory computer-readable medium according to (1) or (2), the functions further comprising:
- a third arranging function configured to arrange the second object at a position to which the user terminal is caused to move from the position of the user terminal.

(4)

The non-transitory computer-readable medium according to any one of (1) to (3),
- wherein the generating function includes a function configured to generate the event that gives a predetermined task to the user, and
- wherein the functions further comprise a giving function configured to give the user a privilege corresponding to the task in a case where the task is achieved.

(4-1)

The non-transitory computer-readable medium according to (4),
- wherein the giving function includes a function configured to give the user the privilege regarding the predetermined event generated after the task is achieved.

(5)

The non-transitory computer-readable medium according to any one of (1) to (4),
- wherein the first arranging function includes a function configured to restrict arrangement of first objects so that a number of the first objects arranged in the virtual space does not exceed a predetermined number.

(5-1)

The non-transitory computer-readable medium according to any one of (1) to (4), the functions further comprising:
   a deleting function configured to delete the first object that is arranged in the virtual space on a basis of the user operation.

(6)

The non-transitory computer-readable medium according to any one of (1) to (5), the functions further comprising:
   a fourth arranging function configured to arrange a third object in a case where a predetermined condition is satisfied, at least an effect by the third object that the user can obtain depending upon a corresponding event thereof being different from that by the second object.

(7)

The non-transitory computer-readable medium according to any one of (1) to (6),
   wherein the second arranging function includes a function configured to arrange the second object at a position located from the position of the first object by a predetermined distance.

(8)

A non-transitory computer-readable medium including a video game processing program for causing a user terminal to perform at least one function of the functions that the video game processing program described in any one of (1) to (7) causes the server to perform, the user terminal being capable of communicating with the server.

(9)

A video game processing system for controlling progress of a video game using positional information of a user terminal of a user in response to a user operation, the video game processing system comprising a communication network, a server, and the user terminal, the video game processing system further comprising:
   a first arranger configured to arrange an object determined on a basis of a user operation as a first object at a position determined on a basis of a position of the user terminal in a virtual space corresponding to map information of a real space;
   a second arranger configured to arrange an object with which a predetermined event is associated at a position determined on a basis of a position of the first object as a second object in the virtual space after a time determined in accordance with the first object elapses from a time when the first object is arranged; and
   a generator configured to generate the predetermined event in accordance with a positional condition regarding the position of the user terminal and a position of the second object.

(10)

The video game processing system according to (9),
   wherein the server includes the first arranger, the second arranger, and the generator, and
   wherein the user terminal includes an output controller configured to output a game screen to a display screen of a display device, the game screen indicating a state of the first object and the second object.

(11)

A non-transitory computer-readable medium including a video game processing program for causing a user terminal to perform functions to control progress of a video game using positional information of the user terminal of a user in response to the user operation, the functions comprising:
   a first arranging function configured to arrange an object determined on a basis of a user operation as a first object at a position determined on a basis of a position of the user terminal in a virtual space corresponding to map information of a real space;
   a second arranging function configured to arrange an object with which a predetermined event is associated at a position determined on a basis of a position of the first object as a second object in the virtual space after a time determined in accordance with the first object elapses from a time when the first object is arranged; and
   a generating function configured to generate the predetermined event in accordance with a positional condition regarding the position of the user terminal and a position of the second object.

(12)

A video game processing method of controlling progress of a video game using positional information of a user terminal of a user in response to a user operation, the video game processing method comprising:
   a first arranging process configured to arrange an object determined on a basis of a user operation as a first object at a position determined on a basis of a position of the user terminal in a virtual space corresponding to map information of a real space;
   a second arranging process configured to arrange an object with which a predetermined event is associated at a position determined on a basis of a position of the first object as a second object in the virtual space after a time determined in accordance with the first object elapses from a time when the first object is arranged; and
   a generating process configured to generate the predetermined event in accordance with a positional condition regarding the position of the user terminal and a position of the second object.

(13)

A video game processing method of controlling progress of a video game by a video game processing system using positional information of a user terminal of a user in response to a user operation, the video game processing system comprising a communication network, a server, and the user terminal, the video game processing method comprising:
   a first arranging process configured to arrange an object determined on a basis of a user operation as a first object at a position determined on a basis of a position of the user terminal in a virtual space corresponding to map information of a real space;
   a second arranging process configured to arrange an object with which a predetermined event is associated at a position determined on a basis of a position of the first object as a second object in the virtual space after a time determined in accordance with the first object elapses from a time when the first object is arranged; and
   a generating process configured to generate the predetermined event in accordance with a positional condition regarding the position of the user terminal and a position of the second object.

INDUSTRIAL APPLICABILITY

According to one of the embodiments of the present disclosure, it is useful to allow to improve interest of a user in a video game.

What is claimed is:

1. A non-transitory computer-readable medium storing a video game processing program for causing a computer of a server to perform functions to control progress of a video game using positional information of a user terminal of a user in response to a user operation, the functions comprising:

firstly arranging a first object determined on a basis of a user operation at a first position determined on a basis of a position of the user terminal in a virtual space corresponding to map information of a real space;

secondly arranging a second object with which a predetermined event is associated at a second position determined on a basis of the first position of the first object in the virtual space after a time predetermined in accordance with the first object elapses from a time when the first object is arranged; and generating the predetermined event in accordance with a positional condition regarding the position of the user terminal and the second position of the second object, wherein the functions further comprise displaying, on the user terminal, a remaining time until the second object is arranged in the virtual space, and the positional condition includes a condition that the position of the user terminal and the second position of the second object have a predetermined relationship.

2. The non-transitory computer-readable medium according to claim 1, the functions further comprising:

selecting a predetermined number of in-game elements from a plurality of in-game element owned by the user in the video game on a basis of the user operation, wherein the firstly arranging includes arranging the first object of a type corresponding to the selected in-game element, and wherein the secondly arranging includes arranging the second object corresponding to the type of the arranged first object.

3. The non-transitory computer-readable medium according to claim 1, the functions further comprising:

thirdly arranging the second object at a position to which the user terminal is caused to move from the position of the user terminal.

4. The non-transitory computer-readable medium according to claim 1, wherein the generating includes generating the event that gives a predetermined task to the user, and wherein the functions further comprise giving the user a privilege corresponding to the task in a case where the task is achieved.

5. The non-transitory computer-readable medium according to claim 4, wherein the giving includes giving the user the privilege regarding the predetermined event generated after the task is achieved.

6. The non-transitory computer-readable medium according to claim 1, wherein the first object includes a plurality of first objects, and the firstly arranging includes restricting arrangement of the first objects so that a number of the first objects arranged in the virtual space does not exceed a predetermined number.

7. The non-transitory computer-readable medium according to claim 6, the functions further comprising:

deleting the first object that is arranged in the virtual space on a basis of the user operation.

8. The non-transitory computer-readable medium according to claim 1, the functions further comprising:

fourthly arranging a third object in a case where a predetermined condition is satisfied, at least an effect by the third object that the user can obtain depending upon a corresponding event thereof being different from that by the second object.

9. The non-transitory computer-readable medium according to claim 1, wherein the secondly arranging includes arranging the second object at the second position located from the first position of the first object by a predetermined distance.

10. A video game processing system configured to control progress of a video game using positional information of a user terminal of a user in response to a user operation, the video game processing system comprising:

a communication network;
a server;
the user terminal;
a processor configured to:

firstly arrange a first object determined on a basis of a user operation at a first position determined on a basis of a position of the user terminal in a virtual space corresponding to map information of a real space;

secondly arrange a second object with which a predetermined event is associated at a second position determined on a basis of the first position of the first object in the virtual space after a time predetermined in accordance with the first object elapses from a time when the first object is arranged; and generate the predetermined event in accordance with a positional condition regarding the position of the user terminal and the second position of the second object, wherein the processor is further configured to display, on the user terminal, a remaining time until the second object is arranged in the virtual space, and the positional condition includes a condition that the position of the user terminal and the second position of the second object have a predetermined relationship.

11. A non-transitory computer-readable medium storing a video game processing program for causing a computer of a user terminal to perform functions to control progress of a video game using positional information of the user terminal of a user in response to the user operation, the functions comprising:

firstly arranging a first object determined on a basis of a user operation at a first position determined on a basis of a position of the user terminal in a virtual space corresponding to map information of a real space;

secondly arranging a second object with which a predetermined event is associated at a second position determined on a basis of the first position of the first object in the virtual space after a time predetermined in accordance with the first object elapses from a time when the first object is arranged; and generating the predetermined event in accordance with a positional condition regarding the position of the user terminal and the second position of the second object, wherein the functions further comprise displaying a remaining time until the second object is arranged in the virtual space, and the positional condition includes a condition that the position of the user terminal and the second position of the second object have a predetermined relationship.

* * * * *